United States Patent [19]

Dahl

[11] Patent Number: 4,862,757
[45] Date of Patent: Sep. 5, 1989

[54] TRANSLATORY DRIVE LINKAGE TYPE OF POWER TRANSMISSION APPARATUS

[76] Inventor: Frank L. Dahl, 5248 W. 119th Pl., Inglewood, Calif. 90304

[21] Appl. No.: 65,934

[22] Filed: Jun. 24, 1987

[51] Int. Cl.$^4$ .......................... F16H 7/02; F16H 7/18; H02K 31/00
[52] U.S. Cl. .................... 74/89.21; 74/216.3; 310/178; 474/84; 474/146; 474/153; 474/255
[58] Field of Search ................. 74/89.2, 89.21, 216.3; 474/84, 146, 147, 148, 153, 154, 164, 202–205, 255, 257; 310/178

[56] References Cited

U.S. PATENT DOCUMENTS

| | | | |
|---|---|---|---|
| 570,698 | 11/1896 | Custis | 74/216.3 |
| 576,105 | 2/1897 | Flindall | 74/216.3 |
| 2,753,980 | 7/1956 | Ballard | 474/164 |
| 2,817,256 | 12/1957 | Malone et al. | 74/216.3 |
| 3,009,723 | 11/1961 | Patrignani | 74/216.3 |
| 3,059,489 | 10/1962 | Gourley | 74/216.3 |
| 3,229,133 | 1/1966 | Sears | 310/178 |
| 3,659,472 | 5/1972 | Engels | 474/84 |
| 3,943,783 | 3/1976 | Boyer | 74/89.21 |
| 4,151,754 | 5/1979 | Reist | 74/89.2 |
| 4,198,875 | 4/1980 | Schneider | 474/205 |
| 4,520,684 | 6/1985 | Meyer et al. | 74/89.21 |
| 4,558,492 | 12/1985 | Hite et al. | 474/257 |
| 4,562,750 | 1/1986 | Arai | 74/89.21 |
| 4,609,365 | 9/1986 | Eberle | 474/154 |
| 4,642,941 | 2/1987 | Staran et al. | 74/89.21 |
| 4,741,432 | 5/1988 | Dekko | 474/153 |

FOREIGN PATENT DOCUMENTS

| | | | |
|---|---|---|---|
| 199417 | 10/1986 | European Pat. Off. | 74/89.2 |
| 1324385 | 3/1963 | France | 74/216.3 |

OTHER PUBLICATIONS

E. H. Myers "The Unipolar Generator" *Westinghouse Engineer* vol. 16, No. 2 Mar. 1956, pp. 59–61.

*Primary Examiner*—Allan D. Herrmann

[57] ABSTRACT

An improved translatory drive linkage type of power transmission apparatus, which, in one preferred form, comprises an improved tape drive type of power transmission apparatus primarily for transmitting power applied thereto at a power entry point to a longitudinally spaced power exit point at a desired power output location. In one form, it includes improved rotary-to-translatory movement apparatus for coupling an input rotary powered driving element to a longitudinal power transmission tape and in one form, it includes novel translatory-to-rotary movement power transmission means for coupling a longitudinally driven tape to a rotary output element, and in one preferred form, it includes both of same, with the arrangement being such that the longitudinal translatory movement portion of a power transmission operation can occur in a compressional mode providing for effective compressional force-transmitting operation of a flexible drive tape, constrained to be non-flexible in its direction of greatest compliance by guiding channel means whereby to make possible the compressional force-transmitting mode of operation along any desired open or closed path having a desired configuration as determined only by the governing configuration of a guiding constraining channel, and this being possible whether or not the flexible longitudinal drive tape used is tensionally connected along its length or is in the form of a plurality of discrete separate segments constrained by the guiding channel means to be in forced end-to-end abutment.

9 Claims, 4 Drawing Sheets

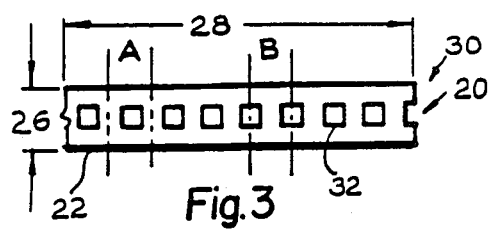
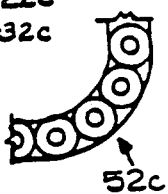
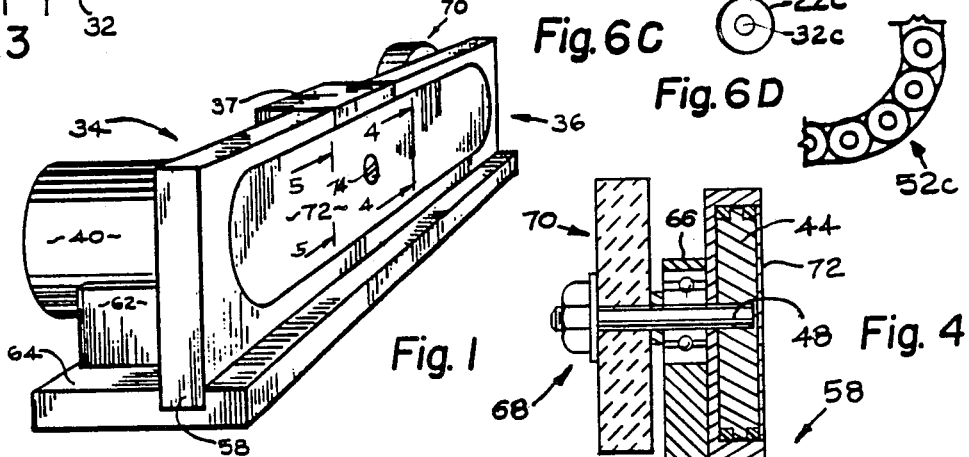
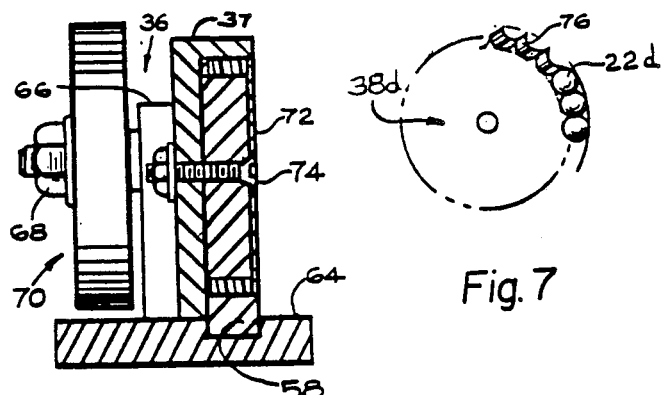
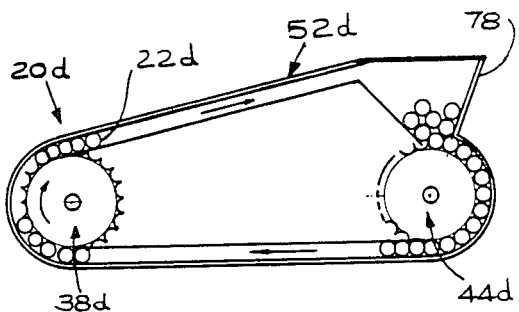
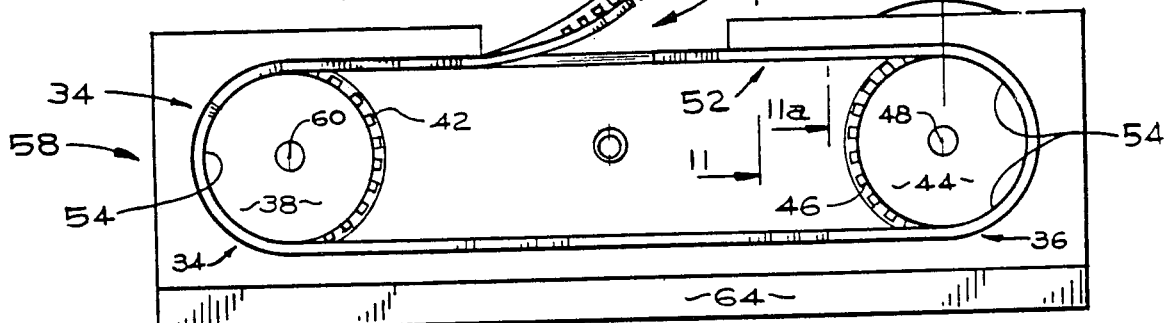
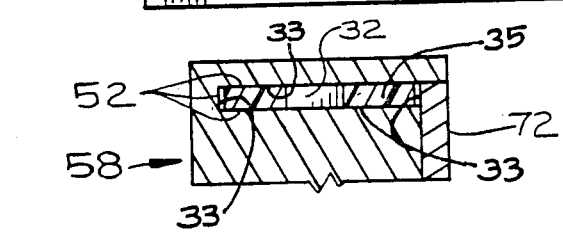
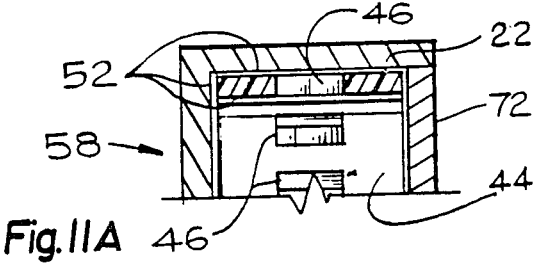

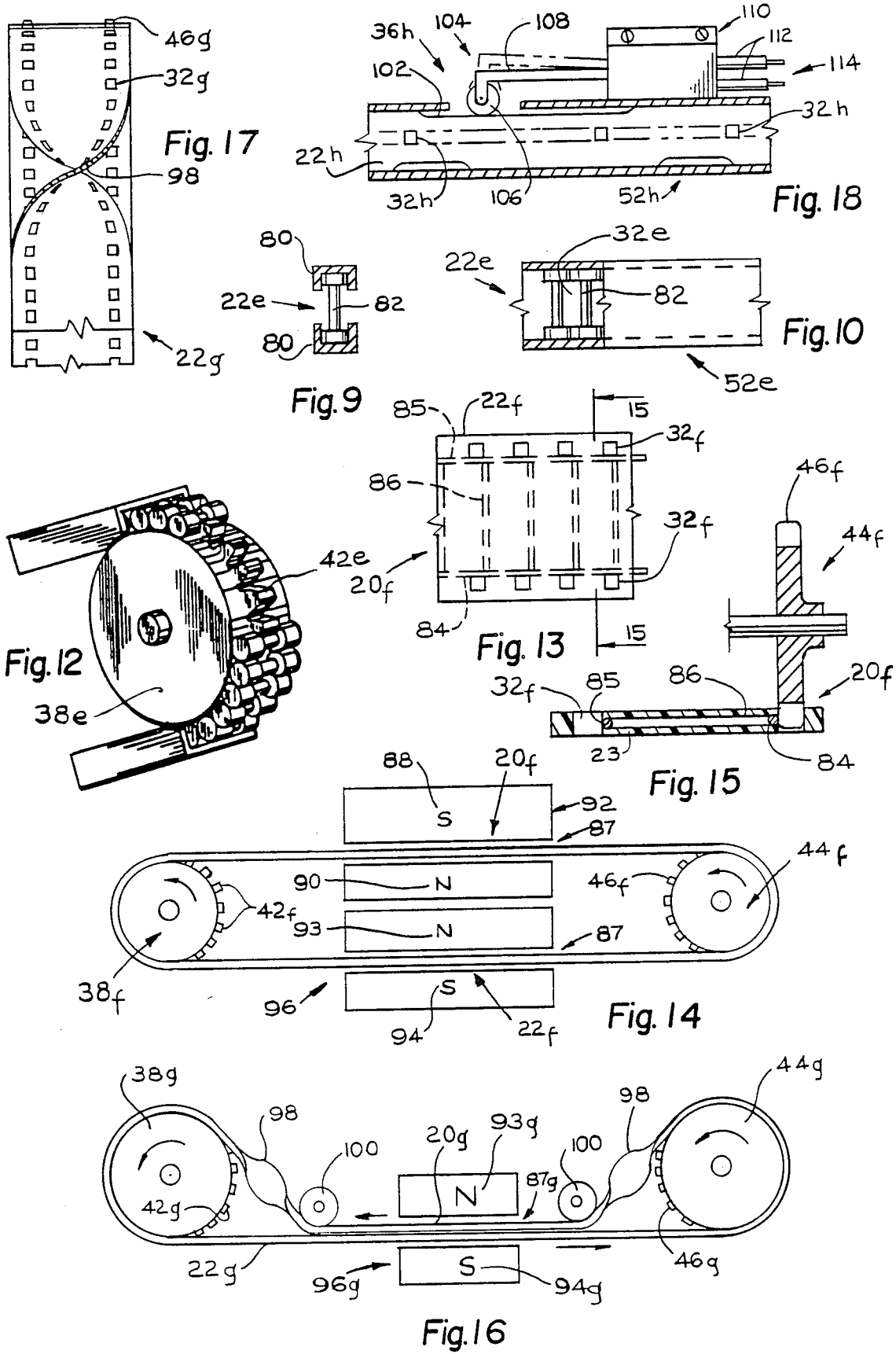

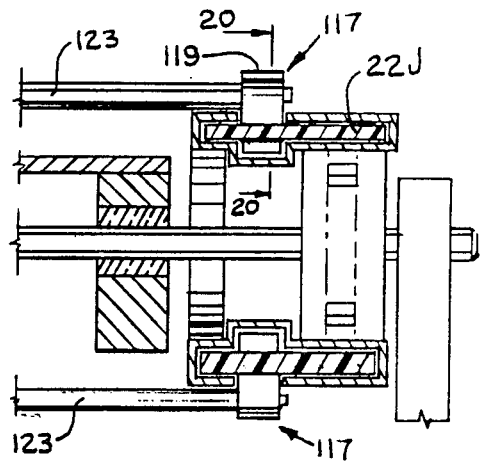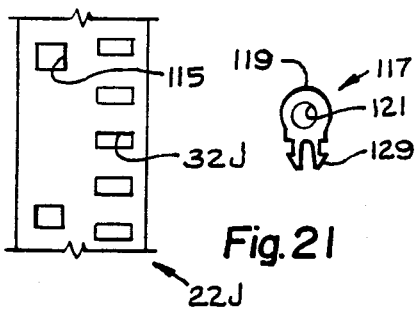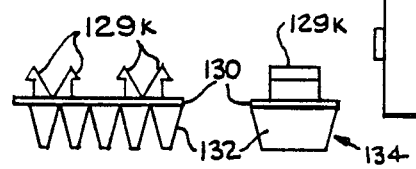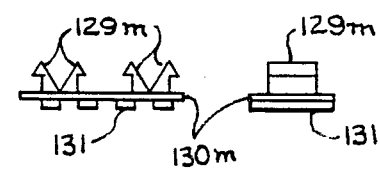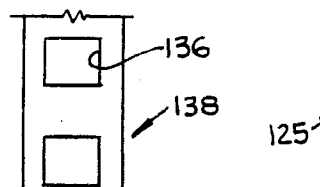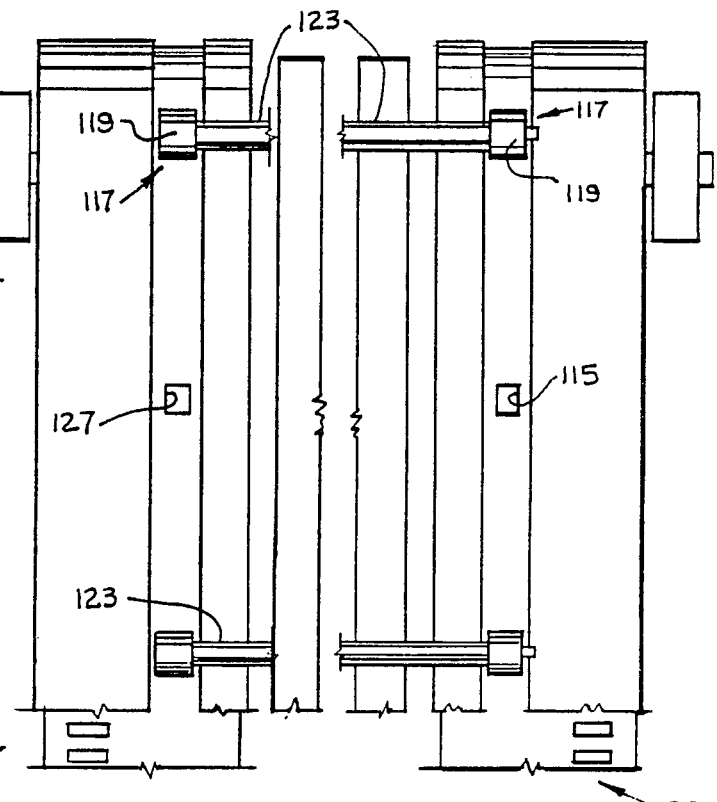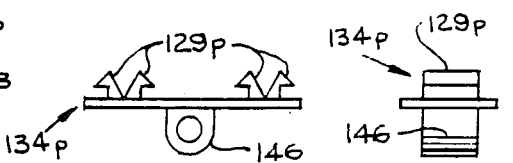

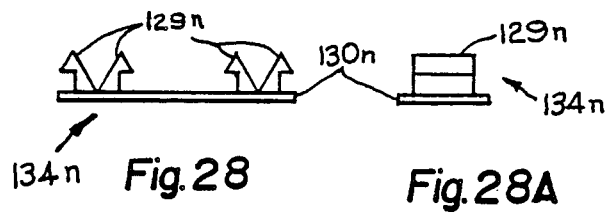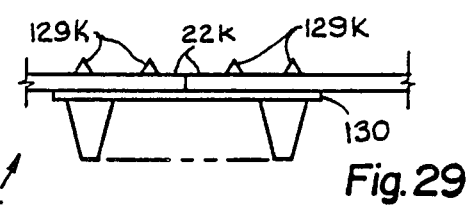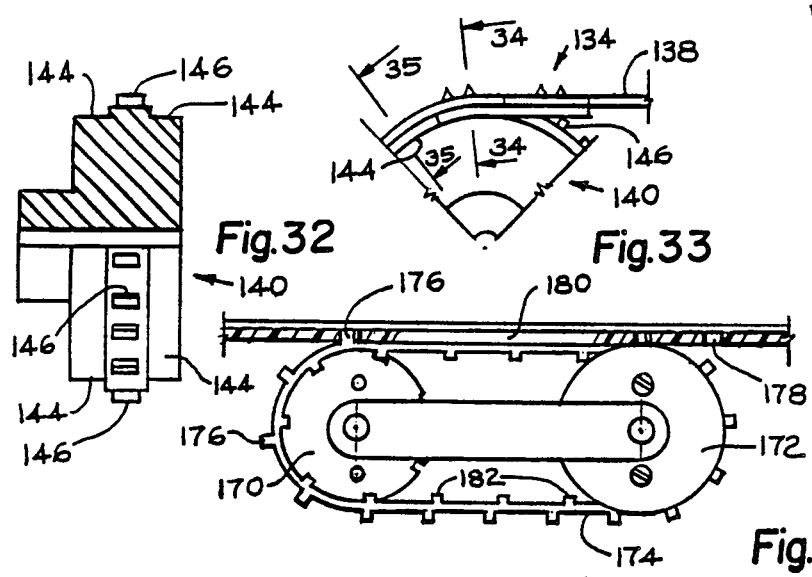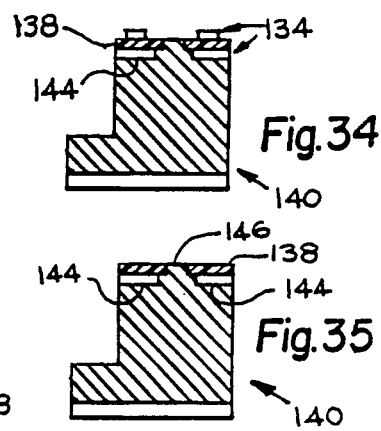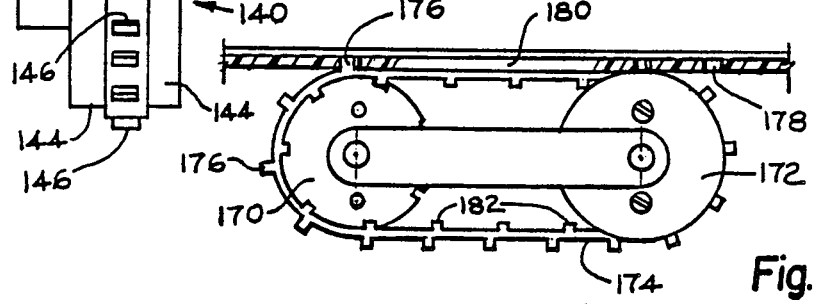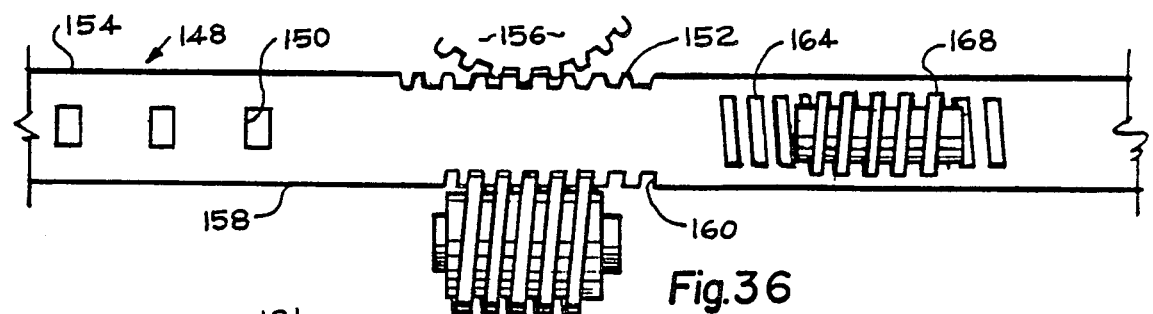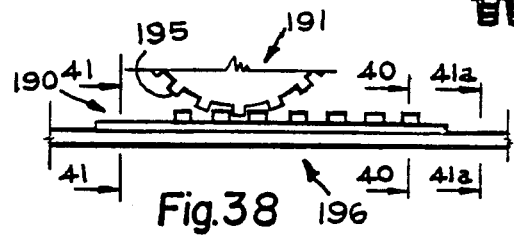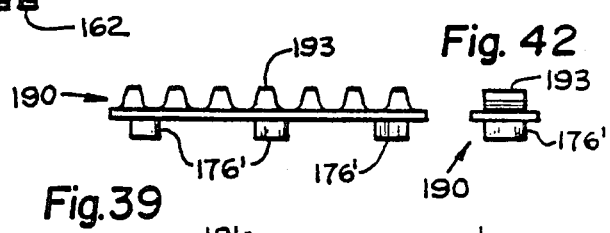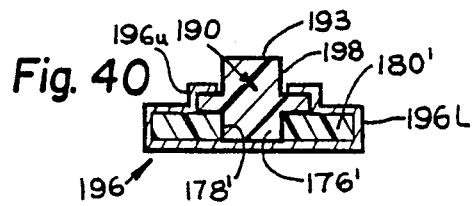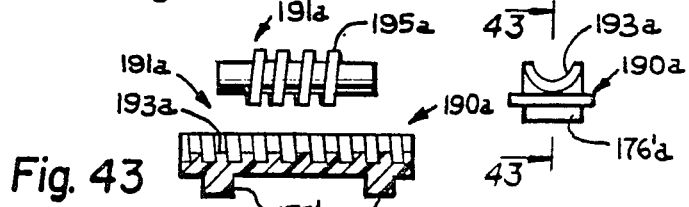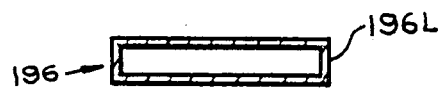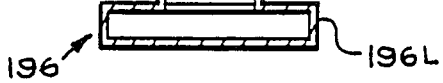

TRANSLATORY DRIVE LINKAGE TYPE OF POWER TRANSMISSION APPARATUS

BACKGROUND OF THE INVENTION

The invention is connected to Disclosure Document No. 151212, which was previously filed in the United States Patent and Trademark Office (via the Commissioner of Patents and Trademarks) on 05/30/86 under the Disclosure Document Program, to be retained for two years thereafter and now to be made a part of the file wrapper hereof.

The field of the invention is generally that of power transmission apparatus and particularly apparatus where rotary power is transmitted from a first point to a second spaced point, usually involving rotary-to-translatory movement conversion step at the output end, such as is involved in conventional arrangements including a powered driving wheel, a second spaced wheel which is to be driven and an interconnecting power transmission belt which may be of V-belt, or which may be of a positive engagement type similar to a chain type belt driven by a sprocket wheel and in turn, at the other end driving a sprocket wheel. There are many other kinds of coupling arrangements for coupling driving wheel or gear and a spaced driving wheel or gear and all such are included in this general reference to the background and field of the invention. Then, of course, there are positively gear coupled arrangements of a great many different specific types according to the specific usage for which the geared power transmission arrangement is intended. A common denominator for these general forms of such power transmission apparatus is the fact that the first-mentioned forms all require that the translatory or longitudinal link portion of the apparatus be continuous—that is, be connected throughout its length which is usually in the form of an endless loop, and, further, these forms all operate said longitudinal or translatory length intention for power transmission purposes which, of course, is the primary reason that the translatory link must be longitudinally connected and in most forms, comprise an endless loop. This somewhat limits the flexibility of design choice in setting up such power transmission arrangments because the endless loop has a finite size and length and coupled with the driving and driven wheels cannot be freely placed in any selected position for power transmission use without major modification thereof, or without purchasing a different size unit. These arguments pertaining to somewhat limited usage flexibility of such power transmission separations apply to an even greater extent with respect to any of the prior art multiple gear coupled power transmission arrangements. They have to be almost individually custom designed for each different individualized usage of such a power transmission system.

Another type of prior art power transmission apparatus for transmitting power between two longitudinally spaced power input and power output points has comprised an arrangement including a driving gear, a longitudinally spaced gear which is to be driven and an interconnecting longitudinal translatory member comprising a toothed rack with the rack teeth thereof engaged with respect to both the driving gear and the longitudinally spaced gear which is to be driven (both gears normally being pinion gears, spur gears, or the substantial equivalent.)

This prior art type of power transmission arrangement is capable of transmitting force between the driving and driven gears by way of the intervening longitudinal toothed rack, and does so in a compressional mode of operation, rather than in a tension mode of operation, as mentioned hereinbefore as comprising a major prior art form of such power transmission equipment. However, the toothed rack form just mentioned is not very adaptable to various different environmental or design conditions of use; in that, it is not suitable for transmitting force in a curvilinear manner, but is primarily only good for straight line transmission of the intervening translatory force, thus, severely limiting its usefulness.

It is clear that any improvement in such power transmission apparatus which would eliminate some of the prior art limitations mentioned immediately hereinbefore would be distinctly advantageous. This would be particularly so, if great flexibility of use could be provided so that the magnitude and direction of the translatory transmission of force between the power input and the power output gears, wheels, or sprockets can be made of virtually any desired length and of virtually any desired configuration, including various different curvatures or the like, and even capable of not being in the form of an endless loop, but having discrete ends open and separate from each other, (thus, overcoming all endless loop tension type systems disadvantages and the spacial non-curvature limitations of the rack system.) Such an arrangement would be distinctly advantageous from the standpoint of simplicity and flexibility of use coupled with simplicity of manufacture and the fact that the system could be easily installed (or easily modified for installation) in a great many power transmission arrangements and would comprise a highly-desirable improvement, because of both the enhanced simplicity and the enhanced flexibility of usage, coupled with other saliently obvious advantages. That is precisely the type of highly-desirable and advantageous improved driving linkage means or, in a preferred form, a drive tape system which is provided by and in the present invention, and which has all of the advantages mentioned above, together with others implicit in the novel aspects of the present invention, and which virtually completely overcomes most presently known prior art problems, disadvantages, and/or limitations, with all of said advantages of the present invention flowing from and occurring by reason of the specific features of the present invention pointed out hereinafter.

SUMMARY OF THE INVENTION

Generally speaking, the present invention comprises improved power transmission apparatus for transmitting power applied thereto at a power entry point to a spaced power exit point at a desired power output location and, in one preferred version, taking the form of an improved rotary-to-translatory movement conversion apparatus and improved translatory-to-rotary-movement conversion apparatus and intervening coupling apparatus usually comprising a longitudinal driving linkage means or, in a preferred form, a drive tape power transmission apparatus extending between the rotary-to-translatory movement conversion means and the translatory-to-rotary-movement conversion means. In one preferred form, intervening drive tape just mentioned comprises a length of flexible drive tape (usually relatively freely laterally flexible) having a substantial longitudinal length direction thereof, a substantially lesser and mutually perpendicular transverse width direction thereof, and a much lesser thin-sheet thickness direction or dimension thereof extending laterally in a direction substantially perpendicular to the longitudinal length direction of the drive tape and substantially perpendicular to the lateral width direction or dimension of the drive tape. In one preferred form, the drive tape is formed of a material (often, a plastic material) having a relatively high modulus of elasticity, particularly in a compressional mode along the length thereof and of a relatively dimensionally stable type, but having inherent substantial flexibility in the lateral thickness direction whereby to make it possible to bend, curve or configure the drive tape along any desired path, straight, curved, or any combination thereof, with the bending occurring in the lateral thickness direction, and with said drive tape being provided along the length thereof with a plurality of longitudinally spaced engagement means (such as drive sprocket apertures, perforations or the substantial equivalent thereof) each extending in a lateral direction (and usually through) the drive tape in the thickness direction thereof, and each being positioned for cooperative force-transmitting engagement with drive sprocket means (or other equivalent driving engagement means) at said power input location. In one preferred form, the drive tape is provided with a first power input region and location, and with a longitudinally spaced therefrom second power output region and location, and, in one preferred form, the power input region and location is positioned for driven cooperation with an external drive sprocket, gear, wheel, or other substantially equivalent drive engagement means, and said power output region and location is positioned for driving cooperation with an external driven sprocket, gear, wheel or substantially equivalent driven engagement means. The drive tape is provided with lateral constraint means cooperable to receive the drive tape therethrough and in closely spaced thickness-direction relationship to the laterally flexible drive tape whereby to exteriorly apply effective stiffening constraint to the drive tape selectively in the lateral thickness direction only whereby to impart compressional integrity to the effective length of the drive tape between the power input and the power output points, regions and locations so that the effective transmission of power therebetween can be effectively compressionally effected.

An important aspect to note is that the lateral constraint means referred to hereinbefore is not limited to straight line transmission of force, but may have straight line portions, curved portions and any combination of same that may be desired and may be open ended or close ended, also as desired. The only limitation on this feature is the fact that the initial orientation or curvature of the lateral constraint means should be in the thin lateral thickness direction of the drive tape where any substantial bending or curvature of the complete power transmission is to occur. This provides great flexibility in use and for so-called "cornering", lifting (and the reverse return movement), virtually any type of compressional transmission of force along virtually any desired one plane configuration and the reverse, if desired and all in a manner determined by the initial set-up, shape and configuration of the lateral constraint means selected by the initial installer and subsequent user of the power transmission apparatus.

In one preferred form, the lateral constraint means referred to hereinbefore comprises substantially encompassing channel means having an interior tape slot therein of a size and shape such as to just be cooperable to receive the drive tape therethrough in closely-spaced thickness-direction relationship to the laterally flexible drive tape whereby to exteriorly apply effective stiffening constraint to the drive tape selectively in the lateral thickness direction only, and to thus impart virtually complete compressional integrity and stiffness within the compressional load limit design factor thereof to the effective length of the drive tape between the power input and power output locations so the effective compressional transmission of power therebetween can be compressionally effected and quite irrespective of whether the drive tape is continuously longitudinally tensionally connected or comprises a series of longitudinally disconnected and isolated pushing segments making up the complete drive tape.

In certain preferred forms of the invention, the drive tape is formed of thin-sheet plastic material such as a polyester resin or the like, of a dimensionally stable type and having said inherent substantial flexibility in the lateral thickness direction and in this preferred form, the plurality of longitudinally spaced drive sprocket apertures (or equivalent) are preferably substantially equidistant and similar to each other as to shape and size.

In one preferred form, the apparatus positively includes driven sprocket means (or substantial equivalent) at the power output point, region and location longitudinally spaced from the power input point, region and location, whereby to facilitate the controlled transmission of input power in the form of torque applied at said power input point, region and location to said drive tape.

Generally, the drive tape can comprise various different types of flexible drive linkage means constrained by the stiff channel means—the tape drive being a preferred form.

Also, in one preferred form, driven sprocket means (or substantial equivalent) is included at the power input point, region, and location longitudinally spaced from said power output point, region, and location whereby to facilitate the controlled transmission of power in the form of torque applied by said drive sprocket means at said power input point, region and location to said longitudinal drive tape, etc., and also, in one preferred form, both said driven sprocket means and said drive sprocket means (and/or substantial equivalents thereof) are positively included.

OBJECTS OF THE INVENTION

With the above points in mind, it is an object of the present invention to provide a novel drive linkage means or, in a preferred form, a novel tape drive type of power transmission apparatus capable of having input power or force applied thereto at a selected input point and to transmit same a distance (which may be a short distance, or a relatively long distance, as required) to a second power or force output point where the output power can be applied to desired end purposes and/or additional apparatus, and with one of the main features being the fact that the length of the power transmission linkage between the input and output points can be virtually any length desired and can be relatively positionally related (for example, curved, straight, or any combination thereof) so that the input and output points can be in virtually any desired relationship to each other, with this arrangement being easily achievable and at relatively low cost. In other words, a very flexible-in-use structure is provided.

It is a further object of the present invention to provide power transmission apparatus of the type referred to in the preceding object wherein the actual longitudinal or translatory power linkage portion of the apparatus between the input and output points comprises a flexible drive tape which is primarily flexible across a relatively thin thickness dimension thereof as differentiated from a perpendicular width dimension or direction thereof and also as differentiated from a mutually perpendicular longitudinal length or direction thereof. This arrangement makes the drive tape primarily flexible inits narrowest so-called thickness or lateral dimension direction so the drive tape can be curved, bent or otherwise configured so as to provide virtually any desired spacing and/or orientation or relative positioning of the two portions thereof adjacent, respectively, to said input and output points.

It is a further object to provide apparatus of the character referred to in the preceding object, wherein the flexible drive tape is effectively provided with a stiffening constraint by guide means or channel means at least partially encompassing the tape around at least a substantial portion of any given cross-section thereof and extending along the length thereof in a length thereof in a length direction and itself, being inherently stiff when oriented in a desired overall shape or configuration which is that shape or configuration in which it is desired to position the flexible drive tape and ti impart stiffness thereto so force (and power) can be transmitted therealong compressionally.

It is a further object to provide apparatus of the character referred to in the preceding object where the input point has the input power or force applied to the flexible drive tape by means of a drive member such as a driving sprocket (gear, wheel, or other substantial equivalent.)

It is a further object of the present invention to provide apparatus of the character referred to in the second preceding object wherein the output point has the output power or force applied thereto by the intervening length of drive tape in the intervening length of constraining stiffening channel or guide means by means of the coupling of an output member such as a driven sprocket (gear, wheel, or other substantial equivalent.)

It is a further object to provide apparatus including the combination of the two immediately preceding objects wherein the power input element comprises a driving sprocket (or substantial equivalent) and the power output element comprises a driven sprocket (or other substantial equivalent) and wherein the intervening length of the drive tape is positively coupled to both said driving input and said driven output elements by reason of being provided with longitudinal engagement means along the length of the drive tape means, such as sprocket holes (or other substantial equivalent.) This provides an arrangement including novel rotary-to-translatory conversion means driving the longitudinal translatory drive tape length compressionally, which in turn, provides at its output a translatory-to-rotary conversion means output power or torque.

It is a further object of the present invention to provide apparatus of the type referred to herein embodying any or all of the features referred to herein, either individually, or in combination, and wherein the construction is of a type requiring relatively low cost manufacturing operations to produce same in volume. This low cost which includes both low initial capital costs for tooling, etc., and low costs as to the actual manufacturing charge per item produced, cooperate to effectively facilitate the widespread production, sale and use of the present invention for the purposes outlined herein, or for any other substantially functionally equivalent purposes.

It is a further object of the present invention to provide apparatus of the type referred to herein wherein the essential heart of the apparatus, broadly speaking, comprises what might be termed drive linkage means, which is flexible, but which can have its inherent flexibility limited as desired by stiff constraint means of any desired configuration. It should be clearly understood that the drive tape form of power transmission means referred to hereinbefore and hereinafter, merely comprises one preferred form of said flexible, but constrained drive linkage means, and that various other forms thereof are also intended to be included and comprehended herein, and it is a further object of the invention to provide all of same. For example, a series of abutting balls or roller members may be positioned within the stiff constraining channel means and adapted to act as the translatory drive linkage means and may be arranged to be engageable with the two driving and driven rotary engagement means. In the case of the multiple roller type flexible drive linkage means, one form thereof may be somewhat dumbell-shaped with a central steel spindle (or equivalent) and plastic rollers at each end, and arranged in parallel abutment with respect to similar adjacent rollers in the constraining channel. This would allow the central steel shaft (or other strong equivalent) to be engaged by the driving and driven rotary engagement means, or sprocket wheels in one preferred form, etc. Even a flexible chain of virtually any type of chain construction, can comprise the flexible drive linkage means, and is capable of compressionally transmitting force therealong, because of the stiffness imparted thereto by the constraining channel. Further, the invention includes novel longitudinal and/or transverse coupling means both, per se, and in combination.

Rather, the real invention is intended to include substantially equivalent constructions embodying the basic teachings and inventive concept of the present invention.

For the purpose of clarifying the nature of the present invention, several exemplary embodiments of the invention are illustrated in the hereinbelow-described figures of the accompanying drawings and are described in detail hereinafter.

BRIEF DESCRIPTION OF THE DRAWING FIGURES

FIG. 1 is a three-dimensional oblique perspective view of one exemplary form of the present invention, wherein it is shown largely from the exterior.

FIG. 2 is a right side elevational view of FIG. 1 with the right side cover plate (and with an oppositely-positioned inverted L-shaped member) removed for drawing clarity. A portion of the drive linkage means is shown artificially broken away and flexibly bent upwardly and slightly twisted (which is not its normal position) in order to clearly illustrate its structure, and how the drive tape may be inserted or removed.

It should be understood that normally, said broken-away portion of the drive linkage means lies flat and in end alignment and abutment relative to the rest of the adjacent drive linkage means for compressional transmission of force (and power.)

FIG. 3 is a fragmentary top plan view of a portion of the particular exemplary, but non-specifically limiting, type of flexible drive linkage means used in FIG. 1 and FIG. 2, wherein said drive linkage means comprises a length of flexible drive tape having a substantial longitudinal length direction thereof, a substantially lesser and mutually perpendicular transverse width direction thereof and a much lesser thin sheet thickness dimension thereof extending laterally in a direction substantially perpendicular to the longitudinal length direction of the drive tape and substantially perpendicular to the lateral width direction of the drive tape.

FIG. 4 is a cross-sectional view taken substantially along the plane and in the direction indicated by the arrows 4—4 of FIG. 1.

FIG. 5 is a view, partially in elevation and partially in cross-section taken substantially along the plane, and in the direction indicated by the arrows 5—5 of FIG. 1.

FIG. 6A illustrates one representative form of a segment or element of a flexible drive tape similar to that shown in FIG. 3, but in the form of multiple end-to-end abutable portions, which will function in a very similar manner to the continuous strip of drive tape shown in FIG. 3 when positioned in the constraint means or guide channel such as that best shown in FIGS. 2, 4, and 5, for example.

FIG. 6B illustrates a slight variation of the representative drive tape segment of FIG. 6A and functions in a similar manner.

FIG. 6C is a further representative, but non-specifically limiting variation of one individual drive tape segment effectively equivalent to that shown in FIG. 6A, or in FIG. 6B.

FIG. 6D is a fragmentary largely diagrammatic view illustrating how the representative type of drive tape segment shown in FIG. 6C can be held in end-to-end abutment in a portion of the stiff constraint means or guide channel (which is shown in fragmentary curved form, for representative purposes only), whereby force applied compressionally to an end drive tape segment will be compressionally transmitted along the curved length of the abutting assembly of the plurality of such drive tape segments in a manner functionally equivalent to that of the FIG. 3 form of drive tape when it is stiffened by its constraint means or guide channel as shown in FIGS. 2, 4, and 5.

FIG. 7 is a fragmentary, partially broken-away three-dimensional, isometric view illustrating one form of either or both of the two rotary engagement means where the segments or elements of the flexible drive linkage means comprise a plurality of balls, shown in force-transmitting engagement therewith. This is a slight modification of previously-described forms thereof.

FIG. 8 is a small scale somewhat diagrammatic view with near sidewall portions of the constraint means and certain of the other elements removed for drawing clarity. This view shows the type of rotary engagement means previously illustrated in FIG. 7 (two of same longitudinally spaced apart) driving a plurality of balls or spheres of the type shown in FIG. 7, and comprising one particular, but non-limiting representation of the multiple segments or elements of the modified drive linkage means shown in both FIGS. 7 and 8 as an alternate shown in FIGS. 1, 2, 3, 4, and 5.

FIG. 9 is generally similar to FIGS. 6A, 6B, and 6C, but illustrates a further slight variation of each of the elements or segments or portions a multi-element form of the flexible drive linkage means, which in this case, comprises a somewhat dumbell-shaped roller adapted to be placed in laterally adjacent paralle axes relationship along the length of the stiff constraint means in the manner shown fragmentarily in FIG. 10, and which will allow the sprocket type of rotary engagement means to engage the longitudinal series of apertures defined between the adjacent central shaft portions of each dumbbell-shaped roller, when assembled in the FIG. 10 manner, for forcibly compressionally engaging and driving the plurality of adjacent rollers.

FIG. 10 is a top plan view, generally similar to FIG. 3, but illustrating a modification where the drive tape effectively comprises the armature of an electric motor of a linear, translatory and/or so-called "homopolar" type (which, of course, includes the reverse operation thereof as a generator.)

FIG. 11 is a fragmentary view partially in elevation and partially in cross-section taken substantially along the plane and in the direction indicated by the arrows 11—11 of FIG. 2 and has bottom portions of the apparatus broken away for drawing simplification reasons.

FIG. 11a is a staggered-plane sectional view similar to FIG. 11, but taken along the plane and in the direction of the arrows 11a—11a of FIG. 2.

FIG. 12 is a fragmentary partially broken-away perspective view showing the FIGS. 9 and 10 modification engaged with one of the two sprocket wheels of the modification.

FIG. 13 is another, but somewhat larger fragmentary plan view of a modified type of drive tape such as is shown in FIG. 3, but in this case, includes a double set of sprocket holes and two transversely spaced longitudinal electrically conductive layers running along the length thereof and provided with what amounts to a plurality of electrical cross-connectors, so as to comprise a linear equivalent of the wired rotor of an electric motor, which in this case, is of a linear, or translatory and so-called "homopolar" type.

FIG. 14 illustrates in diagrammatic form a linear or translatory motor of the previously-mentioned so-called "homopolar" type provided with representative permanent magnet means (or equivalent) for causing a strong magnetic field to be passed across the drive tape of the FIG. 13 type in a direction perpendicular to the cross-flowing electric current adapted to flow in the cross-conductors thereof and also perpendicular to the longitudinal direction of the length of drive tape passing between the magnetic poles, thereby providing the right relationship for a flow of current through the cross wires at the right time, and in the proper relationship to the applied magnetic field will cause force to be applied in a longitudinal direction to the drive tape means, i.e., a translatory or linear motor means. Of course, reverse operation would effectively convert the apparatus to a generator means.

FIG. 15 is a fragmentary enlarged cross-sectional view taken along a plane such as that shown at 15—15 of FIG. 13 when the two driving sprockets and/or motor brushes are in actual engagement therewith in the manner of FIG. 14. However, this view is fragmentary, and shows only a part of a representative one of said two composite sprockets and electric motor brushes.

FIG. 16 is a greatly reduced-scale largely diagrammatic view of a very slight modification of the electrical machine shown diagrammatically in FIG. 14 (said machine comprising either an electric motor or an electric generator in the same structure according to how it is used.)

FIG. 17 is a very fragmentary extremely diagrammatic partially broken-away effective top plan view taken from the top of either of the ends of FIG. 16.

FIG. 18 is a fragmentary view partially comprising a top plan view and partially comprising a sectional view through the channel or guide means taken on a substantially horizontal plane looking downwardly and with the drive tape inside of the sectioned guide channel being shown in top plan view.

FIG. 19 is a fragmentary view, partially in elevation and partially in cross-section showing a slightly modified drive tape arrangement having the sprocket holes nearer to one edge than the other and near the other edge carrying coupling, and/or control holes capable of mounting one or more auxiliary cleats and/or coupling tie rods, etc.

FIG. 20 is a fragmentary cross-sectional view taken substantially along the plane and in the direction indicated by the arrows 20—20 of FIG. 19.

FIG. 21 and 21A show front and side elevations of one representative coupling cleat.

FIG. 22 is a fragmentary partially broken-away top plan view of the modified drive tape of FIGS. 19 and 20.

FIG. 23 is a fragmentary, partly broken-away top plan view illustrating the coupling of the drive tape by the auxiliary control holes, the coupling cleats and tie rods to an auxiliary tape which is also driven thereby.

FIGS. 24 and 24A show side and front elevations of one representative modified form of the cleat of FIGS. 19-20 and 21 having a "v" notch in the top thereof for the making up of an effective "v" belt notch or groove from an aligned plurality thereof.

FIG. 25 and 25A show side and front elevations of another modified form of a cleat means generally similar to the cleat shown in FIGS. 24 and 24A, but including multiple pairs of engagement tips for firm engagement with multiple auxiliary holes and with the opposite surface thereof bearing multiple v-notch defining projections and with the entire cleat being inverted from the cleat position illustrated in FIG. 24.

FIG. 26 and 26A are views generally similar to FIG. 25 and 25A, but illustrate a slight variation of the twin engagement portions type of cleat, wherein the projections on the opposite surface are arranged in spaced relationship such as to effectively convert the cleat into what might be termed a timing belt cleat.

FIG. 27 and 27A are further views generally similar to FIGS. 25 and 25A, and 26—26A but illustrate, again in the inverted position, a cleat having the twin pair of engagement projections on one surface similar to the showings of FIGS. 25 and 26, but having a different type of projections on the opposite surface comprising a tie bar coupling portion or receiver adapted to receive a lateral tie bar in a manner similar to the showing of FIG. 19.

FIG. 28 is another view similar to the showings of FIGS. 25, 26 and 27 with regard to the use of a pair of the twin engagement projections on one surface of the cleat, but having no projection on the opposite surface thereof, but merely the connecting flat splice portion extending between the pair of twin engagement projections for drive tape splicing purposes. The coupling cleat in this form is limited to coupling the abutting ends of adjacent drive tape lengths or portions in order to make an endless loop type of sprocket belt therefrom. It could cooperate for such end splicing purpose with a drive tape of the type shown fragmentarily in FIG. 31 along the outside edges thereof, which would be suitable for cooperation with a modified step sprocket of the type shown in FIG. 32. The outside coupling holes shown in FIG. 31 may not be pre-punched along the full length of the tape in the manner of the center column of sprocket holes shown in FIG. 31, but may be either pre-punched or punched in the field at the time of need.

FIG. 28A is an end elevation of FIG. 28.

FIG. 29 is a fragmentary view illustrating a form of the twin engagement projection type of cleat, also defining v-belt projections on the opposite surface thereof similar to the showing of FIG. 25 and employed as a v-belt defining drive tape abutting ends splicing and coupling cleat. This view also correlates with the showing of FIG. 25 in the manner previously referred to.

FIG. 30 and FIG. 31 are fragmentary plan view showings of two slightly modified drive tapes having differently arranged apertures or perforations for cooperation with the "v" or timing cleats such as shown in FIGS. 25 and 26. These views also correlate with the prior showings of FIGS. 25 and 28 in the manners previously referred to hereinbefore.

FIG. 32 is a plan view showing of the step sprocket previously referred to in connection with the prior description of FIG. 28 and also intended for use with the coupled belt or drive tape in the manners shown in FIGS. 33, 34, and 35.

FIG. 33 is a fragmentary side view showing of the stepped sprocket of FIG. 32 in engagement with a drive tape of the kind shown fragmentarily in FIG. 31 and where abutting ends of the drive tape are spliced together by the coupling cleat of either the FIG. 28 type or the FIG. 29 type.

FIG. 34 is a fragmentary partially broken away cross-sectional view of the showing of FIG. 33 taken right through a pair of the coupling cleats and the drive tape coupled or spliced together thereby and showing the coupling cleat clearance provided by the shoulders of the stepped sprocket of FIG. 32.

FIG. 35 is a fragmentary partially removed cross-sectional view similar to FIG. 34 but shows the plane of the fragmentary section removed from the location of the pair of coupling or splicing cleats shown in FIG. 34 and thus passing only through the drive tape at a non-cleat location.

FIG. 36 is a composite view of four alternate driving arrangements showing a typical sprocket drive portion at the left end of the fragmentarily shown drive tape suitable for cooperation with the modified driving structure shown in FIG. 37, and also shows along a bottom edge of the drive tape a worm gearing longitudinal cut-out configuration and a cooperating driving worm gear (together comprising a first alternate tape driving arrangement) and with the upper middle edge of the drive tape showing a longitudinal rack tooth cut-out portion and a cooperating gear (either a spur gear or pinion gear, or equivalent) and comprising a second alternate tape driving arrangement, and the surface (either top or bottom surface) of a right end portion of the fragmentarily shown drive tape being provided with worm gearing cooperable with a partially shown driving worm (comprising a third alternate driving arrangement) for the drive tape. It should be understood that only one of the four different driving arrangements illustrated in FIG. 36 would normally be used, but the composite showing saves drawing space.

FIG. 37 is a fragmentarily shown side elevation of a modified stress-minimizing arrangement. This view is also partly in side section.

FIG. 38 is a fragmentary partially broken-away side elevational view illustrating another variation of the FIG. 37 stress-concentration-minimization form of the invention which in this variant form thereof, employs an intervening rack structure between a driving gear and the driven tape (or drive linkage means) with the upper surface of the rack shown being adapted to engage a driving gear and with the lower surface of the rack shown having multiple sprocket teeth (or equivalents thereof) which engage the multiple drive tape sprockets thereunder along a desired length thereof for stress-concentration-minization purposes.

FIG. 39 is a side elevational view of aspect similar to FIG. 38, but showing the intervening rack structure alone and removed from both the stiffening channel of FIG. 38 and from its engaged relationship to the drive tape also shown in FIG. 38. This view is primarily for interior structure clarification purposes relative to the assembled showing of FIG. 38.

FIG. 40 is a cross-sectional view taken substantially along the plane and in the direction indicated by the arrows 40—40 of FIG. 38, and shows a complete cross-section of the assembled structure of FIG. 38.

FIG. 41 is a cross-sectional view taken on a plane different from that of FIG. 40 and in the direction of the arrows 41—41 of FIG. 38 and shows a cross-section of the stiffening channel and the interior drive tape stiffened thereby, but beyond the location of the intervening driving rack shown in cross-section in FIG. 40.

FIG. 41A is another cross-section taken in the direction of arrows 41A—41A of FIG. 38.

FIG. 42 is a right end elevational view of the rack alone shown in side elevation in FIG. 39.

FIG. 43 is a side view of aspect similar to FIG. 39, but shows a slightly different form of the intervening member illustrated in FIG. 39, and in this case, having the female receiving worm gear portion associated with a driving worm replacing the upwardly directed pinion-gear-driven teeth of the intervening element shown in FIG. 39. In other words, the FIG. 43 modification has the intervening element driven by a worm and worm gear half-nut portion in lieu of the arrangment of FIG. 39 where the upwardly directed rack teeth are driven by a pinion or spur gear. However, FIG. 43 is a side sectional view taken substantially along the plane and in the direction of the arrows 43—43 of FIG. 44, rather than being a true side elevation in the manner of FIG. 39.

FIG. 44 is a right end elevational view of FIG. 43.

DESCRIPTION OF THE PREFERRED EMBODIMENTS

Generally speaking, the power transmission apparatus of the present invention is intended to have an input, an output longitudinally spaced therefrom and a drive linkage means effectively connectable therebetween and operable at one end by the input and adapated to, in turn, produce a desired action at the output thereof. In many cases, the input comprises force or power and the output comprises force or power and the apparatus can be considered to be essentially a power transmission apparatus intended to transmit power for any desired purpose. However, in certain other forms stemming from the basic concept, the output (and/or the input) may be somewhat modified and may comprise an analagous arrangement which, in one form, may comprise a timing means where the input is similar to that previously referred to, but the output is slightly different and comprises effective cam and cooperating cam follower means for operating timing means, such as a timing microswitch or the like, in a timing electric circuit, or other functionally equivalent arrangement. In another slightly variant form, the input and/or the output may be effective interchangeable and/or effectively reversible and one of same may be of an essentially electromagnetic nature involving the coupling together of two inter-related magnetic fields (either one of which may be a field produced by electric current flow, or a permanent magnet structure.) The other input or output may still be effectively mechanical in nature, thus making the arrangement just generically referred to inclusive of both a linear or translatory electric motor and/or a linear or translatory electric generator. In either case, the flexible drive linkage means is effectively longitudinally movable and effectively comprises what might be termed an armature means adapted for longitudinal movement through a magnetic field produced by magnetic poles placed directly across the thinnest dimension of the drive linkage means (or the drive tape referred to hereinafter.)

In the exemplary first form of the invention illustrated in one representative, but non-specifically limiting form, in FIGS. 1-5 inclusive, the longitudinal translatory effectively flexible drive linkage means referred to herein is indicated generally by the reference numeral 20 and is best shown in FIG. 3 in one specific form wherein it comprises a length of flexible drive tape 22 having a substantial longitudinal length direction thereof, such as that between the left and right ends of the drive tape 22 shown in FIG. 3, and having a substantially lesser and mutually perpendicular transverse width direction thereof, such as that extending directly across the length direction of the drive tape 22 as shown in FIG. 3, and also having a much lesser thin-sheet thickness dimension thereof extending laterally in a direction substantially perpendicular to both said longitudinal length direction of the drive tape 22 and substantially perpendicular to said transverse width direction of the drive tape 22. The so-called thickness dimension just referred to can be seen in FIGS. 2, 4, and 5, is indicated by the arrows 24 in FIG. 2. For clarity, the so-called width dimension is indicated by the arrows 26 in FIG. 3 and the so-called length direction is indicated by the arrows 28 in FIG. 3.

The so-called drive linkage means 20 is provided along the length thereof with a longitudinally spacedly arranged translatory engagement means positioned for cooperative force-transmitting engagement with a driving input rotary engagement means at a power input location (which will be pointed out and described later) and which is also intended to be positioned for cooperative force-transmitting engagement with a driven output rotary engagement means at a power output location (which will be pointed out and described later.) This is true of the exemplary form of the invention illustrated, although all forms of the invention are not so specifically limited.

In the example illustrated, the above-mentioned translatory engagement means is indicated generally at 30 and comprises sprocket apertures such as the exemplary one illustrated at 32 which are spacedly carried along the length of the drive tape 22.

In the specific example illustrated, the drive tape 22 is provided with a first power input region 34 and with a longitudinally spaced therefrom second power output region indicated at 36. The power input region 34 is positioned for driven cooperation with an external driving input rotary engagement means which is generally indicated at 38 and which comprises a driving sprocket wheel in the specific example illustrated, which is power rotated by a motor at 40 which comprises an external driving input rotary means coupled to the driving input sprocket wheel 38 for causing the sprocket wheel teeth 42 to convert motor-applied torque into force sequentially applied to each of the sprocket apertures 32 of the drive tape 22 at said input region 34. This will, of course, cause the drive tape 22 to be longitudinally moved in a translatory manner. Thus, causing the rotary engagement drive sprocket 38 and the series of sprocket holes 32 in the drive tape 22 to effectively comprise rotary-to-translatory power transmission and conversion means of one specific type.

In the specific example illustrated, the sprocket wheel teeth 42 engage the appropriate sprocket apertures 32 of both upper and lower portions of the drive tape 22 which is shown in an effectively endless loop form in the specific exemplary first form of the invention illustrated, as is perhaps best shown in FIG. 2. Thus, the so-called power input region 34 exists at both the top and bottom of the sprocket wheel 38. However, this is not a specific limitation, and if the sprocket wheel 38 were positioned above the upper portion of the drive tape 22, or below the lower portion of the drive tape 22, it would engage only one of said two upper and lower portions at any given time, and there would only be one such power input region 34 instead of the two shown in FIG. 2.

The previously-mentioned power output region indicated generally at 36 is of similar construction to the power input region 34 which has just been described in connection with one specific exemplary, but non-limiting form thereof. The two structures are similar and the so-called driven output rotary engagement means at the power output location 36 is shown in one exemplary form at 44 as comprising a driven sprocket wheel having a plurality of sprocket teeth 46, similar to those of the first-mentioned sprocket wheel 38 and shown at 42 thereof. The second or driven output sprocket wheel 44 similarly cooperates with the corresponding plurality of the sprocket holes or apertures 32 of corresponding portions of the drive tape 22 so that the longitudinal translatory force imparted to the drive tape 22 by the first-mentioned driving sprocket wheel 38 will be effectively converted in a linear-to-rotary-movement conversion manner so as to effectively cause the application of torque to the driven sprocket wheel 44 and to the axle thereof for torque output purposes.

The driven output shaft 48 of the driven sprocket wheel 44 can be applied to any object which is to be operated (power-rotated) thereby, such as the exemplary, but non-specifically limiting grinding wheel indicated generally at 70.

Inasmuch as the drive linkage means indicated generally at 20, which in the exemplary first form of the invention is shown as the laterally flexible drive tape 22, is flexible, primarily in the lateral or thickness direction thereof as indicated at 24 in FIG. 2, it would be incapable alone of compressionally effectively transmitting force and power along the length thereof between input and output locations such as those indicated generally at 34 and 36 in the first exemplary, but non-specifically limiting form of the invention, but it is rendered capable of doing so very effectively by the provision of exteriorly-applied stiffening constraint means (primarily lateral constraint means, although not specifically so limiting), such as that indicated generally at 52 in the first exemplary form of the invention. In the form thereof illustrated at 52, the constraint means defines what might be called a longitudinal flattened slot having width dimensions and depth or thickness dimensions only slightly greater than the corresponding width dimensions and depth or thickness dimensions of the drive tape 22 as indicated at 26 and at 24 respectively, and best shown in FIG. 3 and in FIG. 2, also respectively. The constraint means 52 can actually comprise an at least partially encompassing flattened tube with a longitudinal inner cut-away portion to provide access therethrough for the sprocket teeth 42 and 46 (best shown in FIG. 2), or the constraint means may comprise any other structure which effectively defines such a flattened slotted open longitudinal channel of the configuration of the one shown at 52 in FIGS. 1, 2, 4, and 5, for example (although not specifically so limited). The important feature of the constraint means or guide channel 52 is the fact that it is stiff in itself and closely encompasses (which shall also include the meaning of partially encompassing to various different appropriate extents) whereby to cause the outer stiff constraint means or guide channel 52 to effectively exteriorly apply stiffening constraint to the drive linkage means 20 (the flexible drive tape 22 in the representative first form illustrated) and to thereby impart compressional integrity to the drive tape 22 between the power input location 34 and the power output location 36 so the effective transmission of power and force therebetween can be effectively compressionally caused.

In the specific exemplary form of the constraint means or guide channel 52 illustrated in the first form of the invention, at least that portion thereof which lies in the power input region 34 is slotted or otherwise apertured as indicated at 54 to allow the sprocket teeth 42 to pass therethrough so as to be able to engage the sprocket holes or apertures 32 of the drive tape 22. Similarly, at least that portion of the constraint means or guide channel 52 positioned in the output region or location 36 has its inner surface provided with slot or other effective aperture means 56 to allow the passage therethrough of the sprocket teeth 46 for engagement with the sprocket holes or apertures 32 of the corresponding portion of the drive tape 22. In certain preferred forms, the rest of the constraint means or guide channel 52 may not be provided with such inner slot or aperture means inasmuch as they are not needed except in the power input and power output regions 34 and 36.

In the specific example illustrated, virtually the entire power transmission means is housed in one exemplary, but non-limiting form of housing means indicated generally at 58. It carries the first sprocket wheel 38 and longitudinally spaced therefrom the second sprocket wheel 44 and appropriately mounts same with respect to the housing 58 so as to carry the first axle 60 connecting the first-mentioned sprocket wheel 38 and a driving motor 40, which in turn, is carried by a motor support 62 carried on a base member 64, which also carries the housing 58 thereon. The opposite end of the base member 64 mounts the opposite or remote end of the housing 58 and which in turn, carries the second-mentioned sprocket wheel 44 therein attached to an axle 48 which extends laterally through a ball-bearing-carrying pillow block supporting structure 66 (also mounted on the base member 64) and with the sprocket shaft 48 extending through the pillow block 66 to its central attachment by nut means or the like, 68 to one typical output element of the many representative forms which such may take and which, in the example illustrated, is shown as comprising a grinding wheel 70.

The right hand surface of the housing 58 has a cover plate 72 normally mounted thereon and fastened by a central threaded fastener 74 (best shown in FIG. 5) to the rest of the assembly, which also includes an oppositely-positioned (at the left side of the assembly as viewed in FIG. 5) inverted L-Shaped retainer member 37 which closes off the back central part of the housing 58 and the top central part of the housing 58 in the tape loading (and unloading) aperture or hole 77 (best shown in FIG. 2). The cover plate 72 and the inverted L-Shaped retainer member 37 when fastened together by the screw 74 act to comprise a closed housing during normal operation. However, when the fastening element (threaded screw) 74 is disengaged, the cover plate 72 and the inverted L-Shaped retainer member 37 can both be temporarily removed in the manner best shown in FIG. 2. This provides full top central access to the hollow interior of the hollow housing 58 to allow the initial mounting of the drive tape 22 in the constraint means or guide channel means 52 and for appropriate engagement thereof with the two sprocket wheels 38 and 44, and the removed cover plate 72 provides for corresponding mounting of the two sprocket wheels 38 and 44 within the open hollow housing 58. The top central opening 77 allows the end of the drive tape to be fed into the guide channel 52 and moved therealong until the drive tape sprocket apertures 32 are engaged by each of the two sets of sprocket teeth 42 and 46, after which, the inverted L-Shaped retainer member 37 and the cover plate 72 are re-engaged and the fastening means 74 is operated into tightly fastened relationship. This places the apparatus in condition for operation by energizing the motor 40 which will apply power through the first sprocket wheel 38, the intervening drive tape 32 and the second sprocket wheel 44 to the representative output unit comprising the grinding wheel 70 (which, of course, can be changed to any other desired type of output unit.) This mounting or removal of the drive tape can be accomplished by performing an exact reversal of the above-described drive tape mounting operation. This is also true for the dismounting of either or both of the two sprocket wheels 38 and 44.

FIG. 6A illustrates a very slight modification of the flexible drive linkage means (such as that shown at 20 in FIG. 3) wherein it is not in the form of a continuously-connected length thereof, but is in the form of multiple disconnected, but abuttable segments or portions which operate substantially the same as the FIG. 3 form when mounted within the constraint means or guide channel means such as that shown at 52 of the first form of the invention. It will be seen that the FIG. 6A form comprises a tape element, segment, or portion, indicated by the reference numeral 22a which is identical to that portion of the drive tape 22 of FIG. 3 lying between the two broken lines shown at A. In fact, it would be possible to form the segment 22a of FIG. 6A by merely cutting out the corresponding piece of the drive tape 22 of FIG. 3 along the planes of each of the two broken lines indicated by the letter "A."

FIG. 6B is another representative portion or segment which could have been cut out of the drive tape 22 of FIG. 3 by merely cutting along the planes of the two broken lines indicated by the letter "B" of FIG. 3.

FIG. 6C is again, a view of a segmented type of drive linkage means wherein a single segment or element of an abutting plurality thereof is illustrated and is functionally equivalent to the corresponding representative individual segments of the drive tape shown in FIG. 6A and FIG. 6B.

In the case of FIG. 6B, the representative segment is indicated by the reference numeral 22b and in the case of the differently-shaped representative segment shown in FIG. 6C, it is indicated by the reference numeral 22c. It should be noted that each of the three representative different segment elements of a modified multiple element drive tape as shown in FIG. 6A, FIG. 6B, and FIG. 6C has the equivalent of the full sprocket hole such as shown at 32 in FIG. 3 and in said modified individual segments, the sprocket wheel hole equivalents are indicated at 32a and 32b. These are self-explanatory when it is remembered that in use, there will always be a plurality of each type of individual drive tape segment maintained in longitudinally abutting relationship within the corresponding constraint means or guide channel such as that shown at 52 in the first form of the invention, thus, effectively defining a plurality of longitudinally spaced sprocket holes or apertures for engagement by either of the two sprocket wheels such as those shown at 38 and 44 of the representative first form of the invention.

FIG. 6D illustrates the form of drive tape segment 22c shown in FIG. 6C when assembled in a portion of a curved broken away constraint means or guide channel such as indicated fragmentarily at 52c in FIG. 6D. This view clearly illustrates that the assembly of segments 22c is capable of compressionally transmitting force and power and also shows that the spaces between the adjacent centrally abutting segments 22c act as effective sprocket holes or apertures 32c capable of receiving sprocket wheel teeth therebetween such as the sprocket wheel teeth shown at 42 and at 46 in the representative first form of the invention illustrated, and thus, being in force and power transmitting relationship relative thereto.

FIG. 7 is a fragmentary illustration of a representative one of the two rotary engagement means, which in the first form of the invention took the form of the two sprocket wheels 38 and 44. In the FIG. 7 modification, it should be understood that both of the rotary engagement means at each end are similar to the one shown.

In the example illustrated in FIG. 7, the rotary driving engagement means indicated at 38d has a rim mounted series of fluted pockets indicated at 76 and which are functionally equivalent to the sprocket wheel teeth 42 of the representative first form of the invention, and which positively engage a series of abutting balls or spheres 22d and which comprise another equivalent form of the segmented drive linkage means 20 or drive tape elements 22a, 22b, and 22c of FIGS. 6A, 6B, 6C and FIG. 6D. The arrangement is such that there is positive engagement between the exterior fluted pockets 76 and the plurality of drive linkage means elements or segments 22d which will be fed along the constraint means or guide channel means such as that shown at 52c in FIG. 6D for example, or any other functional equivalent thereof. The rest of this modified form is not shown, since it is similar to that already illustrated and described and therefore, to do so would be redundant.

FIG. 8 illustrates in a very diagrammatic way, a modified power transmission system of the FIG. 7 fragmentarily shown type and, therefore, the parts thereof corresponding to the modified showing of FIG. 7 and corresponding to other similar parts of the first form of the invention illustrated in FIGS. 1-5 inclusive are designated by similar reference numbers followed by the letter "d", however. Thus, the assembly of elements or portions of the drive linkage means 20d and comprising the plurality of balls or spheres 22d (which, incidentally, are incompletely shown) are constrained by the stiff constraint means or guide channel means indicated at 52d and are effectively driven by the first driving engagement means 44d and, in turn, effectively drive the second rotary engagement means indicated generally at 38d in a manner functionally equivalent to the FIG. 2 showing of the first representative, but non-specifically limiting form of the invention shown in FIG. 2. Of course, each of the two rotary engagement means 38d and 44d is provided with the exterior fluted pockets, such as those shown in greater detail at 76 in the larger scale FIG. 7.

FIG. 8 diagrammatic showing also includes another optional feature not present in the FIG. 2 showing of a generally functionally equivalent representative first embodiment of the invention. This comprises the addition of a sump or reservoir chamber such as that indicated generally at 78 and which is adapted to contain a plurality of the individual drive linkage elements or portions 22d comprising balls or spheres in this representative form of the invention.

FIG. 9 illustrates in very fragmentary form, a slight modification of a single element or portion of a modified drive linkage means and corresponding drive linkage means, indicated generally at 22e where it is shown as comprising a dumbell-shaped roller having plastic end caps 80 at each end thereof, mounted on a central insert or shaft portion 82. The arrangement of a plurality of such rollers 22e in a portion of a constraint means or guide channel shown fragmentarily at 52e is best shown in FIG. 10, where each of the rollers 22e is arranged in parallel relation to all the other rollers 22e with all of the central metal inserts or shafts 82 parallel to each other along the length of the fragmentarily shown constraint means or guide channel 52e. It should be noted that each of the rollers 22e has its enlarged cylindrical end caps 80 in contact with the corresponding end caps 80 of the next adjacent roller 22e, so the rollers 22e can be said to be in positive abutment with each other along the length direction of the constraint means or guide channel 52e for the previously-mentioned type of force transmitting and power transmitting operation when driven by a sprocket wheel driver such as the representative one shown fragmentarily at 38e (shown in FIG. 12 in a fragmentary oblique perspective view, which has the driving and driven sprocket wheels positionally reversed.) It should be clearly noted that the spaces or openings between each of the adjacent metal shafts or inserts 82 of the adjacent dumbell-shaped rollers 22e effectively comprises the equivalent 32e of the sprocket holes 32 of the first described form of the invention as illustrated in FIG. 3 and that each of said longitudinally spaced holes 32e is capable of receiving therethrough the sprocket teeth equivalent 42e of the sprocket wheel 38e in a manner similar to that previously-described with respect to the sprocket holes 32 and the sprocket teeth 42 of the first form of the invention, as illustrated in FIGS. 1-5 inclusive. This is also true of the driven sprocket wheel for the FIG. 12 system, which is not shown, because it is the equivalent of the sprocket wheel 44 shown in FIG. 2 and it is thought that the additional illustration thereof and the additional description of the additional illustration would be entirely redundant, in view of the showing of FIG. 2 and the hereinbefore-set forth detailed description thereof.

FIGS. 13, 14, and 15 illustrate a very slight modification of the invention, wherein either the input to the drive linkage means or the output from the drive linkage means, or both of same may be modified to be of a magnetic and/or magnetically coupled type, rather than mechanical, as shown in the previously-illustrated and described representative, but non-specifically limiting forms of the invention.

In the modification of FIGS. 13-15, the so-called drive linkage means 20f comprises a drive tape 22f, which includes surface parts which effectively comprise base portions which, in many ways, is similar to the representative drive 22 illustrated in FIG. 3 of the first form of the invention. However, in this modification, the flexible drive tape 22f carries along each longitudinal transversely spaced side edge thereof effective base portion 23, each carry a longitudinal electrically conductive strip, or bus bar as indicated at 84 which in turn, has connected therebetween across the width dimension of the drive tape 22f a plurality of transverse electrically conductive strips 86, or multiple auxiliary armature wires, carried by corresponding other parts of said effective base portions 23 of the drive tape 22f. This composite electrically conductive strip structure (as indicated at 84 and 86) can be said to effectively comprise a functional armature (84-86) of a homopolar electric-motor-generator means 87 taking the form of of an electric motor and/or an electric generator (depending upon the direction of operation thereof.) The so-called armature can be considered to be generally designated by the drive linkage reference numeral 20f and it has two sets of longitudinal sprocket holes 32f spacedly positioned along the length of the armature 20f and, in the specific example illustrated, also along a different one of the two longitudinal electrically conductive strips 84, so that two composite sprocket wheels and electrically conductive brushes such as indicated at 44f in very fragmentary and diagrammatic form in FIG. 15 will be in electrical communication with the corresponding two longitudinal conductive strips 84 of the armature 20f. Of course, each of the two composite sprocket wheel brushes 44f of FIG. 15 (only one shown) is electrically connected to a different armature energization electric circuit portion, in the case of a homopolar electric motor, so there will be transverse current flowing through the particular transverse electrically conductive strips 86 which are positioned within an electromagnetic field such as that provided between the upper opposed pair of south and north magnetic poles 88 and 90 respectively of the upper permanent magnet indicated generally at 92 in FIG. 14. The electromagnetic interaction and effective coupling between the magnetic field provide across the south and north poles 88 and 90 with the electromagnetic field of the armature 20f provided by electric current flow transversely through the transverse electrically conductive strips 86 will result in the production of force applied longitudinally to the armature 20f when it is in the upper position shown in FIG. 14. Thus, the homopolar electric-motorgenerator means 87 may also be said to comprise an electromagnetic functionally equivalent form of the previously-mentioned coupling means, etc. This causes the entire drive tape 22f to be moved toward the right, (or the left) which will, of course, power rotate the sprocket wheel brushes 44f in a clockwise (or counter clockwise) direction, and will correspondingly cause rotation of the other sprocket wheel 38f which, in this case, is not exteriorly provided with applied torque in the manner of the sprocket wheel 38 of the first form of the invention, as shown in FIG. 2. The directions ("right" or "left" and "clockwise" or "counter clockwise") depend upon the direction of the above-mentioned current flow through the strips 86.

The lower return portion of the drive tape 22f will be moved from right to left as it passes between the opposed pair of magnetic poles 93 and 94 of the lower permanent magnet indicated generally at 96 in FIG. 14. It should be noted that the relative positions of the two magnetic poles 92 and 94 are reversed from those of the poles 88 and 90 of the upper permanent magnet 92. This is done because the drive tape 22f and the armature portion 20f thereof will pass between the lower magnetic poles 93 and 94 in a direction opposite to the passage of the armature portion 20f between the poles 88 and 90 of the upper permanent magnet 92. If this pole reversal were not done, the net force produced would cancel out, but in the arrangement illustrated, the force produced at each magnetic field interaction region is effectively additive.

Of course, it should be understood that the above-description refers to the apparatus of FIGS. 13-15 when operated as an electric motor. However, it should be clearly understood that by merely reversing the operation, it effectively becomes an electric generator. This is done in accordance with well-established electric motor-generator-conversion principles.

FIGS. 16 and 17 illustrate a slight modification of the motor-generator modified form of the invention illustrated fragmentarily in FIGS. 13-15 inclusive. In the FIG. 16 and 17 modification, the purpose is to eliminate one set of the permanent magnets 92 and 96 shown in FIG. 14 and to replace said two permanent magnets with a single equivalent permanent magnet such as is indicated at 96g in FIG. 16. This is accomplished in the modification of FIGS. 16 and 17 by inverting one of the two upper and lower drive tape portions 22g (in the FIG. 16 example illustrated, this is shown as comprising the inversion of the upper drive tape 22g only, but is not specifically limited.) This inversion of the upper drive tape portion 22g makes it possible for both armature-bearing portions 20g carried by the upper and lower drive tapes 22g to pass in opposite directions between the opposed north and south poles 93g and 94g of the single permanent magnet 96g without causing the electromagnetic fields to effectively cancel each other, but to be additive in a manner similar to the showing of FIG. 14 utilizing two magnets 92 and 96.

In the example illustrated in FIG. 16, the two upper inversion points or locations are indicated by the reference numerals 98 and at that location, the drive tape 22g is twisted 180° from its normal orientation into a position where it again lies flat (but inverted) and at that location, it is engaged by a left one of the two idlers or pulley sheaves on the left side and by a similar pulley 100 on the right side from the top, which tends to hold the inverted upper drive tape portion 22g in the selected inverted position while it passes between the poles 93g and 94g of the permanent magnet 96g. To facilitate the endless loop operation of the system of FIGS. 16 and 17, a pair of idlers or pulley 100 engage opposite looped ends of the continuous drive tape 22g. This is merely a representative structure and is not to be construed as limiting the invention thereto; inasmuch as other functionally equivalent arrangements of various types can readily be employed in lieu thereof. The drive tape inversion causes the two longitudinally conductive strips 84 of the drive tape 22g to effectively cross over at the two inversion points 98. This is shown in elevation in FIG. 16 and the left representative one of the two cross-over points 98 is shown in fragmentary top plan view in FIG. 17—it being understood that the right cross-over point 98 is similar to that shown in FIG. 17, but positionally reversed.

FIG. 18 is a fragmentary view partially in top plan view and partially in section, illustrating a modified arrangement where the output is of a slightly different type than the sprocket wheel output of the first form of the invention illustrated in FIGS. 1-5 inclusive. In this slight variation, the output is indicated generally at 36h and is a composite mechanical-electrical output, rather than output torque, such as is provided in the first form of the invention by the output sprocket 44 driving the grinding wheel 70. In the FIG. 18 variation, similar parts are designated by similar reference numerals followed by the letter "h", however, and it can be seen that the constraint means, or guiding channel means indicated generally at 52h (which is shown in horizontal planar section) carries the drive tape 22h therein in the previously-described constrained and stiffened manner (in the example illustrated, primarily stiffened and constrained across the thickness direction of the drive tape 22h, although not specifically so limited.) Also, in the example illustrated, a plurality of the longitudinally spaced sprocket holes 32h is carried along the length of the drive tape 22h in a manner similar to the showing of the sprocket holes 32 of the drive tape 22 shown in FIG. 3, illustrating the first form of the invention. It should be understood that rather than to repeatedly draw the entire series of longitudinally spaced sprocket holes 32h positioned along the fragmentary portion of the length of the complete drive tape 22h illustrated in FIG. 18, only the end two representative ones of the sprocket holes 32h are shown, with longitudinal broken intervening lines being shown for the purpose of indicating the positioning of multiple equally spaced sprocket holes 32h along the length thereof, in a manner substantially equivalent to the showing of FIG. 3 illustrating the exemplary first form of the invention. It is, of course, to be understood that substantially equivalent sprocket wheels, or at least one driving sprocket wheel (and another idler) equivalent to the driving sprocket wheel 38 as shown in FIG. 2 illustrating the first form of the invention is included in the modified form of the invention shown in FIG. 18 and has its sprocket teeth in driving cooperation with the plurality of longitudinally spaced sprocket holes 32h for driving the drive tape 22h along the inside of the constraint means 52h in a manner substantially equivalent to that illustrated in the first form of the invention shown in FIGS. 1-5 inclusive, and described in great detail hereinbefore. It is believed that this makes it unnecessary to again show the complete driving structure in FIG. 18, because of the showing thereof in FIGS. 1-5 and because of the already-set forth detailed description thereof, which would make such a repeated showing entirely redundant.

So far, the FIG. 18 modification is essentially the same as the first form of the invention, but at this point, and hereinafter, differences will now be described. Such differences include the fact that the drive tape has cut away portions 102 at longitudinally spaced locations along the side edges of the drive tape 22h. Thus, any particular one of the two side edges of the drive tape 22h can be said to have full-width portions and cut away portions 102 intermittently longitudinally spaced along the length thereof, and effectively comprising what might be termed cam portions cooperable with cam follower means indicated generally at 104 and, in the specific exemplary, but non-limiting form illustrated in FIG. 18, comprising roller means 106 connected to an operating arm 108 of a microswitch indicated generally at 110 and which has two electric lead portions 112 of an output electric circuit indicated generally at 114 connected to said microswitch 110. It is obvious that as the drive tape 22h is longitudinally driven along the inside of the guide channel means 52h at a constant rate of speed by a drive motor (such as that shown at 40 in the first form of the invention) driving a first driving sprocket wheel (such as that shown at 38 in the first form of the invention), the cam or cut away portions 102 will allow the cam follower roller 106 to be moved between the solid line position shown in FIG. 18 and the broken line position positioned thereabove in FIG. 18. One of these two positions will correspond to actuation of the microswitch 110 thereby producing what might be termed a timing electric signal in the electric circuit 114. It should be noted that either position may be considered to be the closed circuit position and thus, the variation in position of the roller means 106 as caused by the differential spacing of the cam follower cut-out portion 102 and the rest of the regular side edge of the drive tape 22h can be considered to be the operative cam means producing the output of the apparatus (the electrical output in the circuit 114 produced by operating the microswitch 110.) Of course, the relative length of each cut-out portion 102 and the intervening full-width side edge portion of the drive tape 22h can be modified to any relationship desired, so as to produce any desired type of output timing signal of various selected repetition rates and/or of various ratios of "on" time to "off" time, etc., as desired or needed.

It should also be noted that instead of having the cut-out cam follower portions 102 along the side edge of the drive tape 22h, one or more cam tracks may be carried along either the upper surface of the drive tape 22h, the lower surface of the drive tape 22h, or both of same, if desired. Such a surface cam track would be functionally equivalent to the side edge cam track specifically illustrated in FIG. 18, and would, in most instances, require the re-positioning of the cam follower 104 so as to ride along the surface cam track of the drive tape 22h. However, such a re-positioning of the cam track would be functionally equivalent to the side edge cam track version shown in FIG. 18 and is specifically intended to be included and comprehended within the broad scope hereof.

FIGS. 19 through 24 illustrate a very slight modification of the invention, wherein corresponding parts are indicated by similar reference numerals, followed by the letter "j". In this modification, the drive tape 22j has the row of sprocket holes 32j laterally displaced from the center of the drive tape 22j so as to leave the remaining portion thereof available for either pre-punched holes arranged in a desired fashion, or for such holes to be manually punched by a user of the apparatus just prior to use. Said second row of holes, indicated by the reference numeral 115 may be variable as needed and may comprise a large plurality of symmetrically spaced or non-symmetrically spaced holes ranging clear down to a single hole in certain instances. In any case, said auxiliary holes 115 may be said to be coupling holes, tie holes, or control holes, intended for other purposes than the sprocket-engaging function of the row of symmetrically spaced sprocket holes 32j. For example, a controllably mountable and dismountable cleat, such as that shown generally at 117 in FIGS. 19, 20 and 21 may be mounted in any selected one of said auxiliary holes 115 so as to be firmly supported thereby with an upper coupling portion 119 extending above the surface of the drive tape 22j for coupling purposes or other control purposes. In the example illustrated, the upper cleat extension 119 has a lateral coupling hole 121 which may receive one end of a tie rod 123 therein and the opposite end of which may extend laterally into engagement with any desired auxiliary device which is desired to be effectively coupled to, or controlled by, the drive tape 22j, such as is best illustrated in FIG. 23 where it can be seen that another mirror image tape, indicated generally at 125 has. similar perforations 127 carrying similar cleats 117 whereby to be driven whenever the drive tape 22j is drive by its sprocket wheel, and without the necessity of having any other driving means for the auxiliary tape 125.

In the modification illustrated, each cleat 117 may be of an elastically mountable and dismountable type having a base plate (or plate means) 117b provided on one side with resilient bifurcated engagement tips 129 adapted to snap through any of the corresponding auxiliary holes 115 and into firm engagement therewith until forcibly disengaged therefrom by resiliently inwardly deflecting the bifurcated engagement tips 129 to allow removal thereof from the corresponding auxiliary engagement hole 115.

Also, the cleats may have top surfaces on the other side of said base plate 117b shaped with a longitudinal "v" groove such as is shown at 131 in the fragmentary view comprising FIG. 24. It is obvious that if a series of cleats 117 having such top grooves 131 are mounted and arranged in multiple ones of the apertures 115, the "v" shaped tops 131 will comprise a longitudinal "v" shaped trough which can be said to comprise a "v" belt trough portion 131 for use in conventional "v" belt type power transmission systems and the like.

In addition to the cleat (or multiple cleats) 117, functioning in the transverse coupling manner described immediately hereinbefore and fragmentarily illustrated in FIGS. 19 and 20, one or more of the cleats 117 may additionally act as tape butt-end splicing couplers by merely using a tie rod similar to the lateral tie rod 123 shown in FIGS. 19 and 20, but longitudinally directed, instead, so as to longitudinally pass directly over a pair of abutting cut transverse ends of a drive tape and engaging a cleat such as that shown at 117 in FIG. 21 on each longitudinally-spaced portion (longitudinally-spaced across the splice or cut butt-end of the drive tape), thus, acting as an effective tape splicing coupler.

In addition to the above arrangements, one or more of the cleats similar to that shown at 117 may mount on the upper portions thereof in lieu of the upwardly extended coupling portion 119 shown in FIG. 19, a common longitudinally-spaced series of equidistant (or otherwise spaced in a predetermined manner) timing projections, thus, converting the assembly of same, and the multiple cleats mounting same on the drive tape into an effective timing belt for any of a variety of different timing purposes.

Furthermore, the cleat concept, such as the cleat shown at 117 in FIG. 21 may further be used to provide a longitudinal base strip in lieu of the cleat top 119 of FIG. 19 and having at least two cleats extending downwardly thereof at longitudinally-spaced locations and with the intervening longitudinal base member between the cleats having transverse electrical conductor carrier portions or holes adapted to carry a plurality of electric motor-generator parallel transverse electrical conductors therethrough whereby to be functionally effectively equivalent to the homopolar motor-generator arrangement illustrated in FIG. 13, but in this case, using independent electrical wires carried by said carrier portions and capable of being properly connected at opposite ends to main effective bus-bar strips of such an effective homopolar electric motor-generator apparatus.

All of the above arrangements utilizing one or more of the cleat structures adapted to be mounted on the drive tape are intended to be effectively included, comprehended and disclosed herein and hereby, although separate related or divisional, or continuation separate patent application (or applications) and specifically directed to each of such modified applications of the multiple cleat structure in cooperation with the punched drive tape may be filed hereafter, but are entitled to the effective filing date hereof because of the full and complete disclosure thereof made herein.

FIG. 25 illustrates another "v" belt type of cleat (inverted from the showing of FIG. 24) wherein the engagement projections 129k are in the form of two pairs of same carried by the longitudinal base portion 130 and having multiple "v" shaped projections 132 extending downwardly from the opposite surface of said longitudinal coupling or splicing member 130. The arrangement is such that the modified "v" belt type of cleat 134 shown in FIG. 25 may be used at the two abutting ends of a drive tape (such as a drive tape of the type shown in FIG. 30 in the manner depicted in FIG. 29) which causes the "v" belt cleat 134 to act as a coupling device. Then, if desired, to define a continuous "v" belt, similar cleats to that shown at 134 can be affixed to the tape along any portion or all of its length (and also along all of its length, when in the form of an endless loop) which will effectively transform said tape into a "v" belt.

FIG. 26 shows a cleat 134m and comprises what might be termed a timing belt cleat having the two pairs of engagement projections 129m on the upper surface and multiple downwardly directed spaced timing projections 131 which thus, can convert an endless loop drive tape into an endless loop timing belt.

FIG. 28 shows another cleat 134n having the same type of double pair of engagement projections 129n carried by the longitudinal coupling or base portion 130n and which functions entirely as an end coupling device for coupling adjacent ends of one or more tape lengths in order to make an endless loop sprocket driven drive belt. This cleat could, by using the tape holes 136 along the outside edges of the drive tape 138 in FIG. 31 make a tape capable of cooperating with a step sprocket such as that indicated generally at 140 in FIG. 32. Of course, the coupling holes 136 need not necessarily be pre-punched along the full length of the tape (although in certain forms, this may be done) as the center column of sprocket holes 142 need be, but may be punched, "as needed in the field" in certain forms of the invention.

FIGS. 33, 34, and 35 show in some fragmentary and partially sectional detail how a coupled belt or drive tape such as the representative one shown at 138 for example, (although not so specifically limited) would co-act with the stepped sprocket 140 shown in all of the four figures comprising FIGS. 32 through 35. The stepped sprocket 140 has reduced radius shoulders 144 on each side of the central sprocket portion 146 act to provide clearance for the portions of the drive tape 138 carrying the cleats 134 as best shown in FIG. 34.

FIG. 33 clearly illustrates the end splicing or coupling function of the cleat 134.

FIG. 27 shows the slightly modified cleat 134p having the twin pairs of engagement projections 129p similar to the previously-described small cleats, but having a receiver 146 on the opposite (underneath, as viewed in FIG. 27) surface of the cleat adapted to support one end of a lateral tie bar in the general manner of the showing of FIG. 19, the other end of which tie bar (not shown) would be attached to a mirror image of the FIG. 19 structure and to a second tape similar to the drive tape shown at 22j, in FIG. 19.

FIG. 36 illustrates a composite modified showing of slightly modified tape drive arrangements and in this case, the drive tape is indicated at 148 and carries sprocket perforations 150 similar to those previously disclosed in earlier forms of the invention and cooperable to be driven by (or to drive) a sprocket wheel such as any of the earlier-disclosed sprockets, such as those disclosed at 34 and/or 36 in FIG. 2, for example, or elsewhere in any of the earlier disclosures. This would be for either driving engagement with the sprocket holes 150 or for driven engagement by the sprocket hole 150 in any of the manners previously disclosed in detail hereinbefore.

Rack teeth tape edge cut-out portions such as indicated at 152 in FIG. 36 (shown fragmentarily for representational purposes only) may be carried by the edge 154 of the drive tape 148 along all or any desired portion of said tape edge 154 and are arranged for power-transferring cooperation with a spur gear or pinion gear, such as is shown fragmentarily at 156 and which may either drive the tape 148 or be driven by the tape 148 in a manner functionally equivalent to the previous sprocket and sprocket hole cooperation disclosed in detail hereinbefore. This is, of course, an alternate driving arrangement to the sprocket and sprocket aperture driving arrangement just briefly referred to above.

The other edge 158 of the drive tape 148 may carry along all or any desired portion of the length thereof worm wheel or worm gear teeth cut-out portions indicated at 160 and which cooperate with a worm shown fragmentarily at 162 in FIG. 36 so that the worm 162 can effectively transfer power between the worm 162 and the worm wheel teeth cut-out portion 160 of the tape edge 158. This is, of course, an alternate driving arrangement to the previously-described sprocket and sprocket aperture 150 power-transferring arrangement and the other alternate power-transferring arrangement comprising the rack teeth 152 and the spur gear or pinion gear 156 just referred to hereinbefore.

Another alternate driving arrangement is indicated by the tape surface worm wheel teeth defining portion 164 carried by the surface 166 of the drive tape 148 and a cooperating worm shown fragmentarily at 168 in FIG. 36 which provides another alternate driving arrangement.

FIG. 37 illustrates another slightly modified driving arrangement intended primarily for stress-concentration-minimization purposes. In this version, the left sprocket or sprocket wheel 170 is the primary driving sprocket wheel, while the right sprocket wheel indicated at 172 is essentially an idler sprocket. It should be noted that both the driving effective sprocket wheel 170 and the effective idler sprocket wheel 172 are really sprockets only because they have the control or coupling belt 174 carried around the two sprocket wheel 170 and 172 in taut driven relationship by the driving wheel 170 and the sprockets, such as indicated at 176 are actually carried by the exterior of said control or coupling belt 174, thus, effectively converting each of the two inner wheels 170 and 172 into effective sprocket wheels effectively carrying the exterior sprocket teeth 176 in the right pitch or spaced relationship for driving cooperation with respect to the sprocket holes 178 in the drive tape 180. The engagement of the exterior sprocket teeth 176 with the sprocket holes 178 in the drive tape 180 is similar to earlier disclosures set forth hereinbefore, except for the fact that there are multiple sprocket teeth 176 in engagement within multiple sprocket holes 178 along a desired length of the drive tape 180 comprising the length between the tangent point of the top of each of the two sprocket wheels 170 and 172 with the underneath side of the drive tape 180. This multiple point, multi-tooth and multi-aperture engagement reduces or eliminates any localized excessively high stress concentrations which might otherwise exist along the length of the drive tape 180 adjacent to the sprocket apertures 178.

The inner side of the coupling or control belt 174 has different pitch inwardly projecting multiple teeth 182 along the inner length of the coupling belt 174 which engage corresponding receiving apertures in the exterior of the two inner wheels 170 and 172 which may then be said to comprise a synchronous drive belt and twin gear or twin pulley power transmission system capable of providing a great deal of force to the driven control belt 174. Thus, the FIG. 37 arrangement clearly reduces any drive tape localized stress concentrations which might otherwise damage same.

FIG. 38 fragmentarily illustrates a further slight modification of the driving arrangement adapted to minimize localized drive tape stress concentrations and is very fragmentarily shown in view of the full disclosure elsewhere of all of the rest of the structure.

In addition to FIG. 38, FIGS. 39–42 inclusive further illustrate the above-mentioned FIG. 38 slight modification of the driving arrangement, and FIGS. 43 and 44 illustrate a minor variation thereof, all of which are primarily directed to the concept of an intermediate or intervening driving element or unit positioned between an input driving gear and the sprocket teeth (or equivalent) engaging the multiple sprocket holes of a length of the drive tape along a substantial length portion of the drive tape so as to effectively divide and thereby reduce any localized stress concentrations which might otherwise exist between an individual sprocket tooth edge and a corresponding forcibly abutted edge of one of the sprocket apertures in the drive tape. A detailed description of each of said two slightly varied driving arrangements using an intervening driving element or unit will follow hereinafter.

It should be noted that the stress-concentration minimization arrangements shown in FIG. 37 can be modified somewhat by having a coupling belt similar to that shown at 174 in FIG. 37 provided with an edge drive rather than a bottom surface drive for the drive tape such as that shown at 182 in FIG. 37. Such an edge drive would be in lieu of the sprocket teeth drive shown in FIG. 37 and might be of the type indicated by the rack teeth 152 and spur or pinion gear 156 of FIG. 36 or of the type indicated by the worm teeth 160 and the worm 162 of FIG. 36. Also, if desired, it might be of the type indicated by the surface worm wheel teeth 164 and the worm 168 shown in FIG. 36.

Additionally, it should be noted that the multi-engagement along-a-length sprocket tooth and sprocket aperture engagement arrangement shown in FIG. 37 can be effectively combined with an involute tooth and sprocket aperture arrangement shown in FIG. 38 by using an intervening driving rack element 190, such as is clearly shown in FIG. 39 and which has a pinion or spur gear 191 which has gear teeth 195 driving rack teeth 193 of rack element 190, and with the driving rack unit 190 being provided with sprocket teeth 176' on the opposite surface of the rack element 190 from the positioning of the driving sprocket or gear teeth 195. The arrangement is such that the separate intervening rack element 190 is dropped into place with the sprocket teeth 176' being directly inserted in a straight perpendicular line through all the corresponding sprocket holes 178' of the drive tape 180' so there is substantially equal engagement between each of the inserted sprocket teeth 176' and the corresponding adjacent edge portions of the sprocket holes 178' of the drive tape 180'. Thus, when driving force is provided by the spur gear (or by the pinion gear, or equivalent) teeth 195 cooperating with the reciprocal rack teeth 193 on the opposite surface of the drive tape (or drive linkage means) 180' all of the stress-concentration-minimization effect will occur there and the engagement of the multiple sprocket teeth 176' with the multiple sprocket holes 178' along the length thereof will be linear and substantially split between the multiple engagement locations whereby to reduce any otherwise localized stress concentration which might exist along the drive tape 180', particularly around the sprocket holes 178'.

Incidentally, the driving intervening rack element 190 need not be surface driven, but can be either edge driven or surface driven in any of the four different manners previously illustrated fragmentarily in FIG. 36.

It should be noted that the stiffening channel or constraint means indicated generally at 196 consists of a wider lower portion 196L and a narrower upper portion 196U. This is to allow the wider lower portion to receive and stiffen the drive tape 180' in an appropriate and effective manner while allowing the narrower upper portion 196U to receive and guide along the length thereof the intervening rack element or unit 190. Furthermore, the narrower upper stiffening channel portion 196U has a slot 198 extending vertically through the top wall thereof to allow the rack teeth 193 to extend upwardly therethrough into an external position for driven engagement with the driving gear teeth 195 of the driving pinion or spur gear 191.

The slightly variant intervening element arrangement shown fragmentarily in FIGS. 43 and 44 is functionally similar to the just-described arrangement shown fragmentarily in FIGS. 38 through 42 and corresponding parts are indicated by the same reference numerals followed by the letter "a", however. As illustrated in FIGS. 43 and 44, this variant form has the intervening element 190a provided on its upper surface with female worm gearing 193a functionally equivalent to the rack teeth 193 of the form shown in FIGS. 38-42 inclusive. Also, the driver for the female worm gearing 193a comprises a driving worm 191a having the appropriate spirally arranged driving worm gear teeth 195a which functionally correspond to the spur gear teeth 195 shown in FIG. 38 and which will longitudinally drive the entire intervening unit or element 190a in a manner similar to the spur gear driving of the rack toothed intervening element 190 of the modification shown in FIGS. 38 through 42. Of course, the modification of FIGS. 43 and 44 operates within a stiffening channel or constraint means generally similar to that shown at 196 in FIGS. 38, 40 and 41 and the lower teeth 176' a are adapted to engage sprocket holes of a drive tape similar to those shown at 178' and 180' of FIG. 40. These items are not included in FIGS. 43 and 44, since they have already been shown in the prior slightly variant form of FIGS. 38-42.

It should be noted that in connection with various previously described forms of the invention, and in particular, those forms illustrated in FIGS. 14, 16, and 17, the drive tape 22f in one case and 22g in another case need not be in the form of a continuous endless loop, even though it effectively may operate in a manner equivalent to such. This is so, because a portion of the tape where it passes around a driving sprocket wheel, such as that shown at 38f in FIG. 14 or at 38g in FIG. 16 and while it is within the constraint means can have up to one-half of its circumferential length around said sprocket wheel eliminated because the sprocket wheel teeth engage both such circumferentially spaced portions of the drive tape and act as a coupler and careful examination will show this will not interfere with the satisfactory operation of the effective power transmission system comprised by the elements of such a modified structure.

It should be noted that the present invention is directed to the novel coupling means for longitudinal coupling, transverse coupling, lateral coupling, and for coupling novel "v" belt trough-defining constructions and/or homopolar-motor-generator armature-wire-carrying constructions, or other equivalent, considered per se or considered in combination with the rest of the apparatus, and/or both, and the specification and claims are directed to each and every such aspect thereof, considered either individually or in combination.

It should be noted that the illustrated and previously described forms of the invention carrying intelligence (and/or information) along the length thereof such as the timing tape version shown in FIG. 18 and any of the other versions which can be provided with such an information-bearing channel along the length thereof can have such intelligence and/or information recorded thereon in any of a number of different manners, of course, intended for corresponding appropriate readout variations of readout equipment, etc. Such an information channel instead of being edge-carried and comprising physical shape changes of the drive tape along the length thereof as shown in FIG. 18, may comprise one or more magnetically recorded channels, one or more optically recorded channels, or physical variation types of recorded channels. The magnetically recorded channels may be of any well known type, and may include Dolby pre-modification for signal-to-noise ratio enhancement purposes, if desired. The optically recorded channel version thereof may include one or more optically recorded channels of the variable density type, the variable area type, or a type comprising recorded patterns corresponding to interference and/or defraction patterns capable of being discerned and effectively read by one or more laser beam pick-ups, or may comprise the new type of laser pick-up extremely miniaturized optical recording channels. Furthermore, any of the various types of recordings may be of either conventional analog type, or of converted-to-digital type with all of the great advantages inherent in such a system having a virtually unlimited signal-to-noise ratio.

It should further be noted that the inverted drive tape form of the invention shown in FIG. 16 and 17 can be modified to comprise a Moebius strip configuration which configuration will perform quite satisfactorily in the previously-described apparatus.

It should be specifically noted that the foregoing detailed descriptions of the several representative, but nonspecifically limiting versions of the invention shown in the figures of the drawings are to be considered as representative only of the broad generic concept of each of the cooperating elements of the invention, and all such are intended to be included and comprehended herein.

In the drive tape first form of the invention, dimensionally stable plastic resin material such as dimensionally stable polyester resin plastic film material is preferably employed. However, the invention is not specifically so limited, and various other suitable materials may be employed in lieu thereof.

It should be understood that the figures and the specifdescription thereof set forth in this application are for the purpose of illustrating the present invention and are not to be construed as limiting the present invention to the precise and detailed specific structures shown in the drawing figures and specifically described hereinbefore. Rather, the real invention is intended to include substantially equivalent constructions embodying the basic teachings and inventive concept of the present invention.

What is claimed is:

1. Improved power transmission apparatus for transmitting power applied thereto at a power entry point to a spaced power exit point at a desired power output location and taking the form of an improved rotary-to-translatory movement and translatory-to-rotary movement power transmission and coupling apparatus, comprising: longitudinal translatory effectively flexible drive linkage means, said drive linkage means being provided along a length thereof with a longitudinally spacedly arranged translatory engagement means positioned for cooperative force-transmitting engagement with driving input rotary engagement means at said power input location and for cooperative force-transmitting engagement with driven output rotary-engagement means at said power output location, said drive linkage means being provided with a first power input region and location and with a longitudinally-spaced-therefrom second power output region and location and with said power input region and location being positioned for driven cooperation with an external driving input rotary engagement means, and with said power output region and location being positioned for driving cooperation with an external driven output rotary engagement means, and four-direction constraint means cooperable to receive said drive linkage means therethrough in closely-spaced relationship to said effectively flexible drive linkage means whereby to exteriorly apply stiffening constraint to said drive linkage means and to thereby impart compressional integrity to the effective length of said drive linkage means between said power input and said power output locations, so the effective transmission of power and force, therebetween can be effectively compressionally caused; said drive linkage means being provided along any desired portion of a length thereof with auxiliary coupling means mounting means offset from said longitudinally spacedly arranged translatory engagement means carried by said drive linkage means; said coupling means being provided with upstanding effective plate means provided with and carrying thereabove connection portions whereby, when aligned in multiple, to define effective connection means of effectively continuous configuration; said drive linkage means comprising a length of flexible drive tape having a substantial longitudinal length direction thereof, a substantially lesser and mutually perpendicular transverse width direction thereof, and a much lesser thin-sheet thickness dimension thereof extending laterally in a direction substantially perpendicular to said longitudinallength direction of said drive tape and substantially perpendicular to said transverse width direction of said drive tape, and wherein said longitudinally spacedly arranged translatory engagement means comprises drive sprocket apertures, said drive tape being formed of a material having inherent substantial flexibility in said lateral thickness direction and being provided along the length thereof with a plurality of said longitudinally spaced drive sprocket apertures, each extending laterally through said drive tape in said thickness direction and being positioned for cooperative force-transmitting engagement with drive sprocket means at said power input location, and wherein said four-direction constraint means comprises a special form thereof especially shaped so as to be cooperable to receive said drive tape therethrough and in closely-spaced thickness-direction relationship to said laterally flexible drive tape whereby to exteriorly apply effective stiffening constraint to said drive tape selectively in the lateral thickness direction only, whereby to impart compressional integrity to the effective length of the drive tape between said power input and said power output locations so the effective transmission of power therebetween can be effectively compressionally caused; said four-direction constraint means having two pairs of substantially mutually perpendicular, substantially-drive-tape-enclosing guide wall portions comprising four different outside enclosing parts thereof, with the guide wall portions of each one of said pair thereof being opposed to the other one of said pair and being spaced apart just sufficient to receive the corresponding part of an inwardly adjacent drive tape when such is carried by said four-direction constraint means, and with each of said enclosing guide wall portions having an inside guiding surface area of more than one-half of the immediately inwardly adjacent drive tape surface of an enclosed drive tape when such is carried by said four-direction constraint means enclosed and rigidly supported therein between two different sets of opposite pairs of said inside guiding surface areas of said guide wall portions of said four-direction constraint means in four mutually perpendicular and mutually opposed constraint directions.

2. Improved power transmission apparatus for transmitting power applied thereto at a power entry point to a spaced power exit point at a desired power output location and taking the form of an improved rotary-to-translatory movement and translatory-to-rotary movement power transmission and coupling apparatus, comprising: longitudinal translatory effectively flexible drive linkage means, said drive linkage means being provided along a length thereof with a longitudinally spacedly arranged translatory engagement means positioned for cooperative force-transmitting engagement with driving input rotary engagement means at said power input location and for cooperative force-transmitting engagement with driving input rotary engagement means at said power output location said drive linkage means being provided with a first power input region and location and with a longitudinally-spaced-therefrom second power output region and location and with said power input region and location being positioned for driven cooperation with an external driving input rotary engagement means, and with said power output region and location being positioned for driving cooperation with an external driven output rotary engagement means, and lateral constraint means cooperable to receive said drive linkage means therethrough in closely-spaced relationship to said effectively flexible drive linkage means whereby to exteriorly apply stiffening constraint to said drive linkage means and to thereby impart compressional integrity to the effective length of said drive linkage means between said power input and said power output locations, so the effective transmission of power and force, therebetween can be effectively compressionally caused; said drive linkage means being provided along any desired portion of a length thereof with auxiliary coupling means mounting means offset from said longitudinally spacedly arranged translatory engagement means carried by said drive linkage means; at least one auxiliary coupling means provided with an engagement portion controllably manually engageable and disengageable with respect to any selected one of said auxiliary coupling means mounting means whereby to be firmly carried thereby until manually forcibly removed therefrom, each auxiliary coupling means having a projecting coupling portion for attachment by an extending connected link member to another similar coupling portion of another similar auxiliary coupling means for providing positive coupling therebetween; said coupling being provided with an effective base plate provided with and carrying thereabove "v" belt trough portions whereby, when longitudinally aligned in multiple, to define effective longitudinal "v" belt trough means of effectively continuous configuration.

3. Apparatus as defined in claim 2, wherein said drive linkage means comprises a length of flexible drive tape having a substantial longitudinal length direction thereof, a substantially lesser and mutually perpendicular transverse width direction thereof, and a much lesser thin-sheet thickness dimension thereof extending laterally in a direction substantially perpendicular to said longitudinal length direction of said drive tape and substantially perpendicular to said transverse width direction of said drive tape, and wherein said longitudinally spacedly arranged translatory engagement means comprises drive sprocket apertures, said drive tape being formed of a material having inherent substantial flexibility in said lateral thickness direction and being provided along the length thereof with a plurality of said longitudinally spaced drive sprocket apertures, each extending laterally through said drive tape in said thickness direction and being positioned for cooperative force-transmitting engagement with drive sprocket means at said power input location, and wherein said lateral constraint means comprises a special form thereof especially shaped so as to be cooperable to receive said drive tape therethrough and in closely-spaced thickness-direction relationship to said laterally flexible drive tape whereby to exteriorly apply effective stiffening constraint to said drive tape selectively in the lateral thickness direction only, whereby to impart compressional integrity to the effective length of the drive tape between said power input and said power output locations so the effective transmission of power therebetween can be effectively compressionally caused.

4. Apparatus as defined in claim 2, wherein each of said coupling means mounting means comprises a prepunched portion of said linkage means for receiving the corresponding engagement portion therein for firm supported engagement until forcibly removed therefrom.

5. Apparatus as defined in claim 2, wherein each of said coupling means mounting means comprises a selectively punchable-as-needed portion of said linkage means for receiving the corresponding engagement portion therein for firm supported engagement until forcible removed therefrom.

6. Improved power transmission apparatus for transmitting power applied thereto at a power entry point to a spaced power exit point at a desired power output location and taking the form of an improved rotary-to-translatory movement and translatory-to-rotary movement power transmission and coupling apparatus, comprising: longitudinal translatory effectively flexible drive linkage means, said drive linkage means being provided along a length thereof with a longitudinally spacedly arranged translatory engagement means positioned for cooperative force-transmitting engagement with driving input rotary engagement means at said power input location and for cooperative force-transmitting engagement with driven output rotary-engagement means at said power output location, said drive linkage means being provided with a first power input region and location and with a longitudinally-spaced-therefrom second power output region and location and with said power input region and location being positioned for driven cooperation with an external driving input rotary engagement means, and with said power output region and location being positioned for driving cooperation with an external driven output rotary engagement means, and lateral constraint means cooperable to receive said drive linkage means therethrough in closely-spaced relationship to said effectively flexible drive linkage means whereby to exteriorly apply stiffening constraint to said drive linkage means and to thereby impart compressional integrity to the effective length of said drive linkage means between said power input and said power output locations, so the effective transmission of power and force, therebetween can be effectively compressionally caused; said drive linkage means being provided along any desired portion of a length thereof with auxiliary coupling means mounting means offset from said longitudinally spacedly arranged translatory engagement means carried by said drive linkage means; at least one auxiliary coupling means provided with an engagement portion controllably manually engageable and disengageable with respect to any selected one of said auxiliary coupling means mounting means whereby to be firmly carried thereby until manually forcibly removed therefrom, each auxiliary coupling means having a projecting coupling portion for attachment by an extending connected link member to another similar coupling portion of another similar auxiliary coupling means for providing positive coupling therebetween; said drive linkage means being provided with effective base portions effectively comprising multiple parallel transverse homopolar electric-motor-generator armature conductor support means for carrying cooperation with multiple auxiliary armature wires adapted to be effectively connected at opposite ends to effective parallel bus bar means of a homopolar electric-motor-generator means.

7. Apparatus as defined in claim 6 wherein said drive linkage means comprises a length of flexible drive tape having a substantial longitudinal length direction thereof, a substantially lesser and mutually perpendicular transverse width direction thereof, and a much lesser thin-sheet thickness dimension thereof extending laterally in a direction substantially perpendicular to said longitudinal length direction of said drive tape and substantially perpendicular to said transverse width direction of said drive tape, and wherein said longitudinally spacedly arranged translatory engagement means comprises drive sprocket apertures, said drive tape being formed of a material having inherent substantial flexibility in said lateral thickness direction and being provided along the length thereof with a plurality of said longitudinally spaced drive sprocket apertures, each extending laterally through said drive tape in said thickness direction and being positioned for cooperative force-transmitting engagement with drive sprocket means at said power input location, and wherein said lateral constraint means comprises a special form thereof especially shaped so as to be cooperable to receive said drive tape therethrough and in closely-spaced thickness-direction relationship to said laterally flexible drive tape whereby to exteriorly apply effective stiffening constraint to said drive tape selectively in the lateral thickness direction only, whereby to impart compressional integrity to the effective length of the drive tape between said power input and said power output locations so the effective transmission of power therebetween can be effectively compressionally caused.

8. Apparatus as defined in claim 6, wherein each of said coupling means mounting means comprises a prepunched portion of said linkage means for receiving the corresponding engagement portion therein for firm supported engagement until forcible removed therefrom.

9. Apparatus as defined in claim 6, wherein each of said coupling means mounting means comprises a selectively punchable-as-needed portion of said linkage means for receiving the corresponding engagement portion therein for firm supported engagement until forcibly removed therefrom.

* * * * *